United States Patent
Kakihara et al.

(10) Patent No.: US 7,543,108 B2
(45) Date of Patent: Jun. 2, 2009

(54) STORAGE SYSTEM AND STORAGE CONTROL METHOD ACHIEVING BOTH POWER SAVING AND GOOD PERFORMANCE

(75) Inventors: Shinobu Kakihara, Odawara (JP); Mitsuhide Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 490 days.

(21) Appl. No.: 11/500,436

(22) Filed: Aug. 8, 2006

(65) Prior Publication Data

US 2007/0294552 A1   Dec. 20, 2007

(30) Foreign Application Priority Data

Jun. 20, 2006   (JP)   ............................. 2006-170563

(51) Int. Cl.
*G06F 13/34*   (2006.01)
(52) U.S. Cl. ..................... 711/112; 711/114; 713/320
(58) Field of Classification Search ................. None
See application file for complete search history.

(56) References Cited

U.S. PATENT DOCUMENTS 6,583,947 B1   6/2003   Hakamata et al.
7,340,623 B2 *   3/2008   Kato et al. ................. 713/320

FOREIGN PATENT DOCUMENTS

| JP | 2000-149383 | 11/1998 |
| JP | 2000-293314 | 4/1999 |

* cited by examiner

*Primary Examiner*—Hyung S Sough
*Assistant Examiner*—Ngoc V Dinh
(74) *Attorney, Agent, or Firm*—Reed Smith LLP; Juan Carlos A. Marquez, Esq.

(57) ABSTRACT

A storage system connected to a host device from which IO commands are sent comprises a plurality of load devices that act as loads including a plurality of storage devices, a current measuring unit that measures a current value flowing into the plurality of load devices, a power calculating unit that calculates at each time a power consumption value consumed by the plurality of load devices based on the measured current value, and a controller that receives an IO command from the host device, and accesses a storage device that follows the IO command out of the plurality of storage devices. The controller carries out power consumption control such that the calculated power consumption value is not more than a predetermined allowed power value and a difference between the power consumption value and the allowed power value is as small as possible.

20 Claims, 15 Drawing Sheets

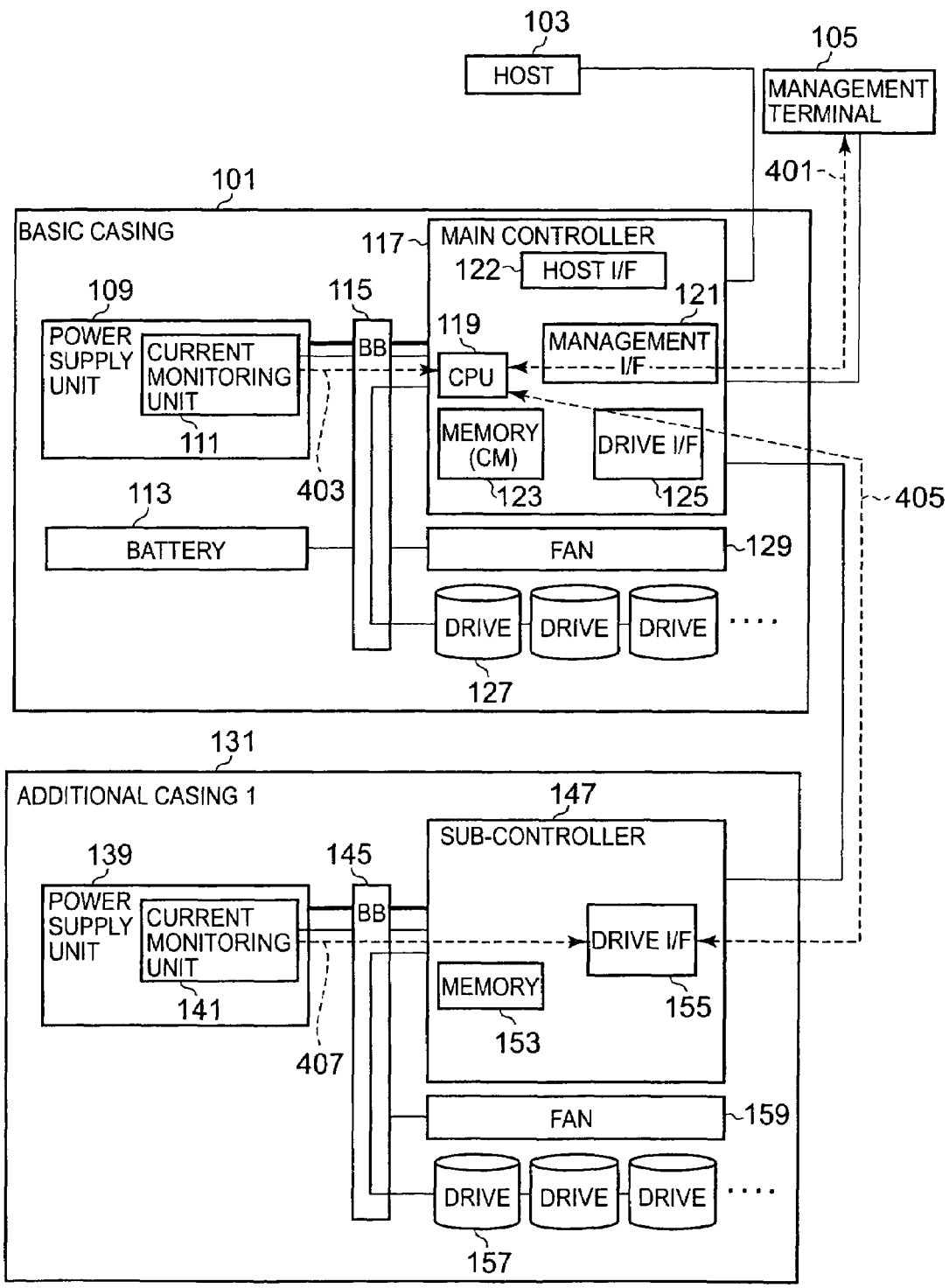

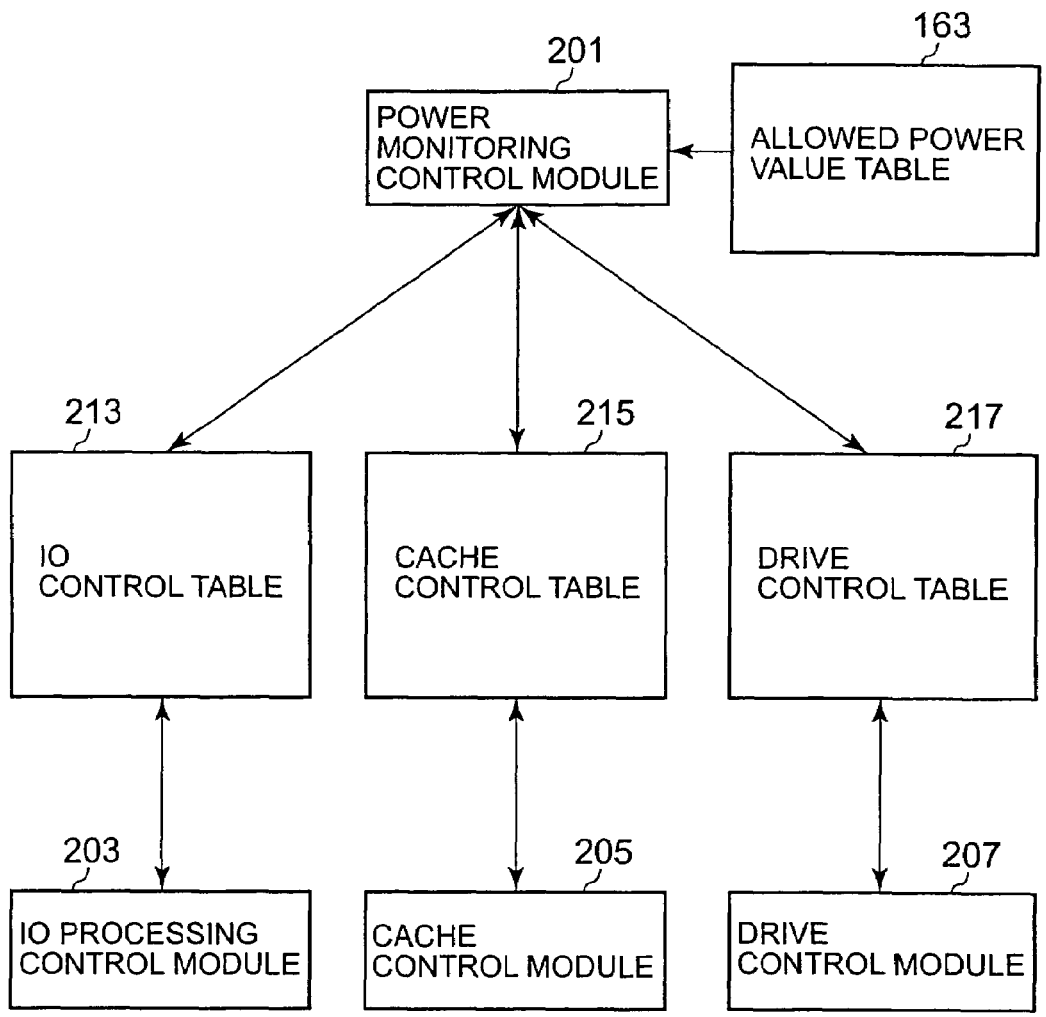

| STORAGE SYSTEM ID | ALLOWED POWER VALUE (KW) | CASING ID | ALLOWED POWER VALUE (KW) |
|---|---|---|---|
| STORAGE SYSTEM 1 | ○○○ | CASING 1 | × × × |
| | | CASING 2 | △ △ △ |
| | | ⋮ | ⋮ |
| ⋮ | ⋮ | ⋮ | ⋮ |

163

FIG. 12
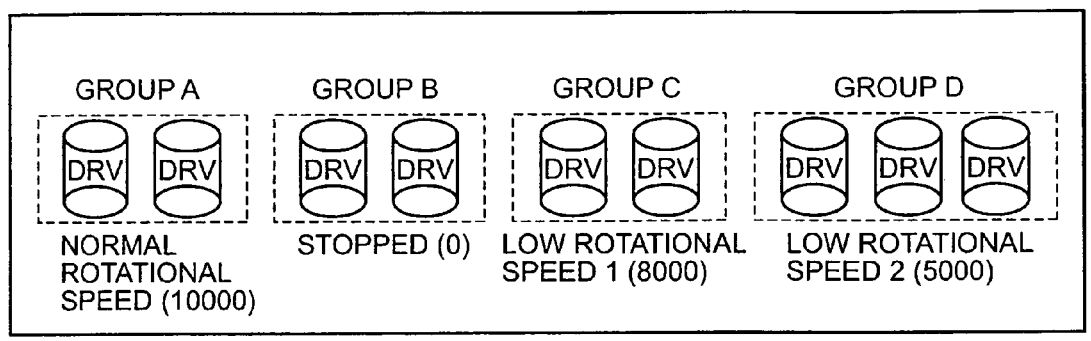
FIG. 13
DRIVES IN FIRST CASING
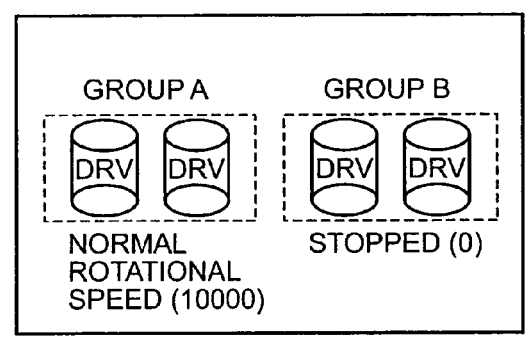
DRIVES IN SECOND CASING
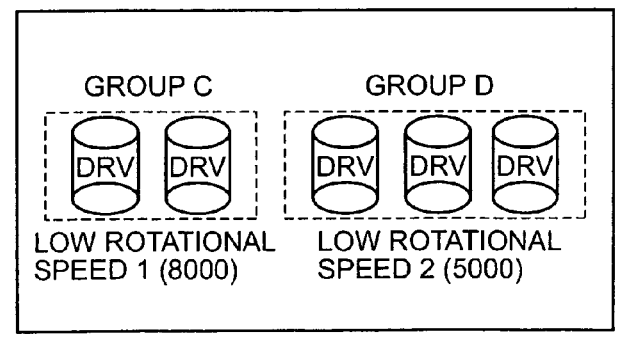

FIG. 15
DRIVES IN BASIC CASING
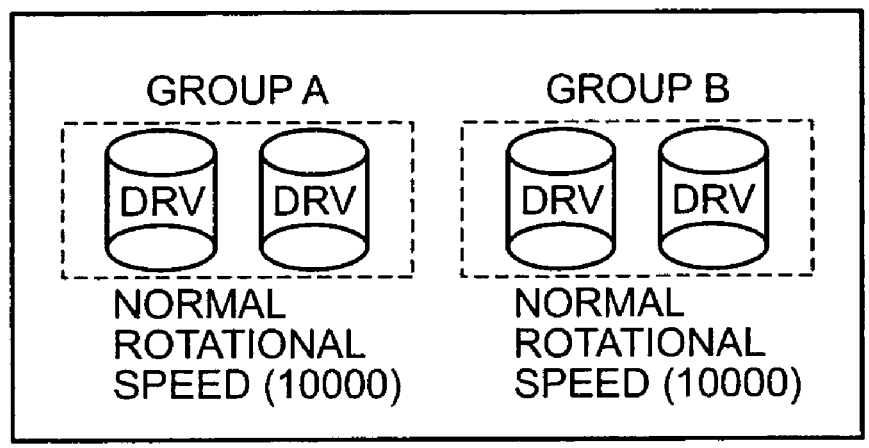
DRIVES IN ADDITIONAL CASING 1
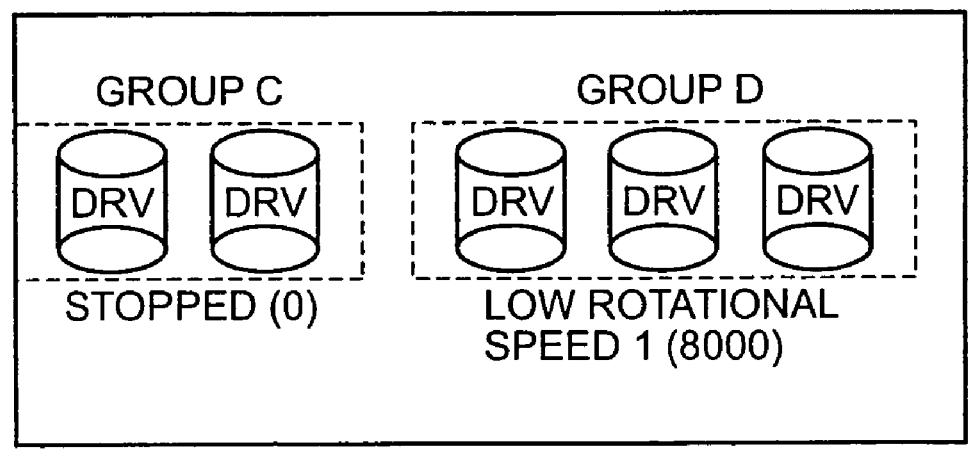

STORAGE SYSTEM AND STORAGE CONTROL METHOD ACHIEVING BOTH POWER SAVING AND GOOD PERFORMANCE

CROSS-REFERENCE TO PRIOR APPLICATION

This application relates to and claims priority from Japanese Patent Application No. 2006-170563, filed on Jun. 20, 2006, the entire disclosure of which is incorporated herein by reference.

BACKGROUND OF THE INVENTION

1. Field of the Invention

The present invention relates to controlling the power consumption of a storage system having a plurality of storage devices therein.

2. Background of the Invention

In recent years, computerization has proceeded, and management of enormous amounts of data has come to be required. Accompanying this, there have been advances in increasing the capacity of storage systems.

One method of increasing the capacity of a storage system is to increase the number of storage devices installed therein. Examples of storage devices are disk devices (e.g. hard disk drives). However, a large amount of power is consumed in rotating a disk, and hence upon increasing the number of disk devices, the overall power consumption of the storage system increases. There are thus increased running costs, and in some cases, large-scale equipment investment may be necessary (e.g. it may be necessary to make increases in a power distribution panel in a building in which the storage system is installed).

Means for saving on power consumption are thus required. Known art for saving on power consumption includes Japanese Patent Application Laid-open No. 2000-293314 (hereinafter "document 1") and Japanese Patent Application Laid-open No. 2000-149383 (hereinafter "document 2").

According to the art disclosed in document 1, for a storage system, after access from a host device has ceased and a predetermined time has elapsed, control of disk device power saving is carried out (through selection of power supply on/off or a power saving mode). Moreover, in the case that there is access from the host device, if the power supply of the disk device to be accessed is off, then the power supply of that disk device is turned on, and then the access is carried out.

According to the art disclosed in document 2, a microprocessor in a storage system monitors the current capacity used during spindle startup of each of groups of disk devices, and upon detecting that the current consumption has increased, cancels spindle startup for disk devices, thus carrying out control such that the current consumption is not more than a threshold value.

SUMMARY OF THE INVENTION

In an operating state after having been started up, a storage system can receive an IO command (a data write command or read command) from a host device, and process the received IO command. In the operating state of the storage system, it is necessary to not only save on power consumption, but also maintain performance (e.g. IO command processing performance) at a certain level. In the operating state of the storage system, it is thus necessary to achieve both power saving and good performance. However, art for realizing this cannot be elicited from document 1, document 2, or a combination thereof.

It is thus an object of the present invention to achieve both power saving and good performance in an operating state of a storage system.

Other objects of the present invention will become apparent from the following description.

A storage system according to a first aspect of the present invention is a storage system connected to a host device from which an IO command is sent, the storage system comprising a plurality of load devices that act as loads including a plurality of storage devices, a current measuring unit that measures a current value flowing into the plurality of load devices, a power calculating unit that calculates at each time a power consumption value consumed by the plurality of load devices based on the measured current value, and a controller that receives the IO command from the host device, and accesses a storage device that follows the IO command out of the plurality of storage devices. The controller carries out power consumption control such that the calculated power consumption value is not more than a predetermined allowed power value and a difference between the power consumption value and the allowed power value is reduced. Here, "the difference . . . is reduced" means, for example, that in the case that the power consumption value this time is lower than the power consumption value after the power consumption control last time, and so the difference between the power consumption value and the allowed power value this time has become greater than the difference between the power consumption value and the allowed power value after the power consumption control last time, this difference is reduced.

In a first embodiment, the power consumption control comprises carrying out power consumption suppression control in which the power consumption value is suppressed but a load device operating state is degraded, and releasing the power consumption suppression control, so as to adjust the number of times that the power consumption suppression control is carried out. For example, in the case that the difference between the power consumption value and the allowed power value this time has become greater than the difference between the power consumption value and the allowed power value after the power consumption control last time, this difference can be reduced by stopping the power consumption suppression control being carried out. Moreover, in the case, for example, that the power consumption value this time exceeds the allowed power value, the power consumption value can be reduced by carrying out the power consumption suppression control.

In a second embodiment, the storage system further comprises a basic subsystem having at least the controller therein, and an additional subsystem connected to the basic subsystem. The allowed power value is prepared taking each subsystem as a unit. The additional subsystem comprises at least two load devices including at least two storage devices, a second controller that communicates with the controller, and a second current measuring unit that measures a current value flowing into the at least two load devices. The second controller acquires from the second current measuring unit a second current value which is the current measured by the second current measuring unit. The controller acquires the second current value from the second controller, calculates a power consumption value for the second controller based on the second current value, and carries out the power consumption control for each subsystem separately in accordance with the calculated power consumption value and which subsystem this power consumption value is for.

In a third embodiment, in the case of the first embodiment, the controller carries out, as the power consumption suppression control, IO processing control of delaying commencement of IO processing according to the received IO command.

In a fourth embodiment, in the case of the third embodiment, each of the plurality of storage devices is a disk drive having a rotating disk as a storage medium. In the IO processing control, out of a plurality of IO commands to be targeted for IO processing delay, the controller prioritizes processing an IO command for sequential access over an IO command for random access.

In a fifth embodiment, in the case of the third embodiment, in the IO processing control, out of a plurality of IO commands to be targeted for IO processing delay, the controller prioritizes processing an IO command for which a storage device to be accessed is in a high operating state over an IO command for which a storage device to be accessed is in a low operating state. Here, the high operating state may mean, for example, the power supply being on, or if the storage device is a disk drive, the disk rotational speed being high. The low operating state may mean, for example, the power supply being off, or if the storage device is a disk drive, the disk rotational speed being low (this rotational speed may be zero).

In a sixth embodiment, in the case of the first embodiment, the storage system further comprises a cache memory. The controller is constructed so as to write data to the cache memory in accordance with an IO command from the host device, and write the data written to the cache memory to a storage device that is to be accessed according to the IO command. As the power consumption suppression control, the controller carries out cache control of controlling an order of writing to the storage devices from the cache memory.

In a seventh embodiment, in the case of the sixth embodiment, in the cache control, out of a plurality of data in the cache memory, the controller prioritizes writing data that is to be written to a storage device in a high operating state over data that is to be written to a storage device in a low operating state.

In an eighth embodiment, in the case of the first embodiment, as the power consumption suppression control, the controller carries out storage device control of putting a storage device operating state into a low operating state.

In a ninth embodiment, in the case of the eighth embodiment, in the storage device control, the controller decides the storage device to be put into the low operating state based on at least one of an access frequency and whether or not there has been access recently for each of the plurality of storage devices.

In a tenth embodiment, the plurality of storage devices include a first storage device and a second storage device. As the power consumption control, the controller carries out processing of putting the first storage device into a high operating state, moving data in the second storage device into the first storage device, and putting the second storage device from which the data has been moved into a low operating state.

In an eleventh embodiment, in the case of the tenth embodiment, the first storage device is provided in a basic subsystem having the controller therein. The second storage device is provided in an additional subsystem connected to the basic subsystem.

In a twelfth embodiment, at least two storage device groups are formed from the plurality of storage devices. Each of the storage device groups is constituted from a predetermined number of at least two of the storage devices. The controller controls the storage device operating state taking the storage device groups as units.

In a thirteenth embodiment, in the case that a storage device in a low operating state is to be accessed, the controller determines whether or not a power consumption value predicted to increase due to the storage device being put into a high operating state is not more than the allowed power value, and if the predicted power consumption value is not more than the allowed power value, puts the storage device into the high operating state and then accesses the storage device.

In a fourteenth embodiment, upon at least one change out of adding, removing, and blocking a load device, the power calculating unit acquires a current value and calculates a power consumption value after the change. The controller carries out the power consumption control based on the power consumption value calculated after the change.

In a fifteenth embodiment, the storage system further comprises a power supply unit that supplies power to the plurality of load devices. The current measuring unit is provided in the power supply unit.

In a sixteenth embodiment, the plurality of load devices include first load devices and second load devices. The storage system is constructed from a basic subsystem and an additional subsystem connected to the basic subsystem. The allowed power value is prepared taking each subsystem as a unit. The basic subsystem comprises the controller, at least two of the first load devices, and a first power supply unit that supplies power to the at least two first load devices. The first power supply unit has therein a first current measuring unit that measures a current flowing into the at least two first load devices. The additional subsystem comprises at least two of the second load devices including at least two storage devices, a second controller that communicates with the controller, and a second power supply unit that supplies power to the at least two second load devices. The second power supply unit has therein a second current measuring unit that measures a current value flowing into the at least two second load devices. The second controller acquires from the second current measuring unit a second current value which is the current value measured by the second current measuring unit. The controller acquires the second current value from the second controller, calculates a power consumption value for the second controller based on the second current value, and carries out the power consumption control for each subsystem separately in accordance with the calculated power consumption value and which subsystem this power consumption value is for. The power consumption control comprises carrying out power consumption suppression control in which the power consumption value is suppressed but a load device operating state is degraded, and releasing the power consumption suppression control, so as to adjust the number of times that the power consumption suppression control is carried out.

A management computer according to a second aspect of the present invention is a computer connected to a storage system as described above, the management computer comprising a storage resource, an allowed value setting unit that sets the allowed power value into the storage system, a power consumption management unit that acquires the power consumption value calculated at each time and records the power consumption value in the storage resource, and a display control unit that displays the recorded power consumption value.

In an embodiment, the management computer further comprises an IO monitoring unit that acquires the number of IO processing instances in each time period, and records in the storage resource a relationship between the time period and the number of IO processing instances. The display control unit displays a relationship between the number of IO processing instances in each time period and the power consumption value at each time. The display control unit may display in the same display area a graph of the number of IO processing instances in each time period and a graph of the power consumption value at each time.

Each of the above units of the storage system and the management computer can be realized by hardware (e.g. a circuit), a computer program, or a combination thereof (e.g. at least one CPU that reads in and executes a computer program). Each computer program can be read in from a storage resource (e.g. a memory) provided in a computer. Such a storage resource includes installing via a recording medium such as a CD-ROM or a DVD (Digital Versatile Disk), and downloading via a communication network such as an internet or a LAN.

BRIEF DESCRIPTION OF THE DRAWINGS

FIG. 3 is a diagram for explaining in outline characteristic features of the present embodiment;

FIG. 4 is a diagram for explaining processing carried out by a CPU 119;

FIG. 5 shows an example of the construction of an allowed power value table 163;

FIG. 12 shows an example of a plurality of drive groups being in a single casing in a first variation of the embodiment of the present invention;

FIG. 13 shows an example of a plurality of drive groups being in a plurality of casings in the first variation of the embodiment of the present invention;

FIG. 15 shows an example in which a drive group in a basic casing is at a normal rotational speed and a drive group in an additional casing is at low speed in a third variation of the embodiment of the present invention;

DETAILED DESCRIPTION OF THE PREFERRED EMBODIMENT

Following is a description of an embodiment of the present invention.

Figure 1:
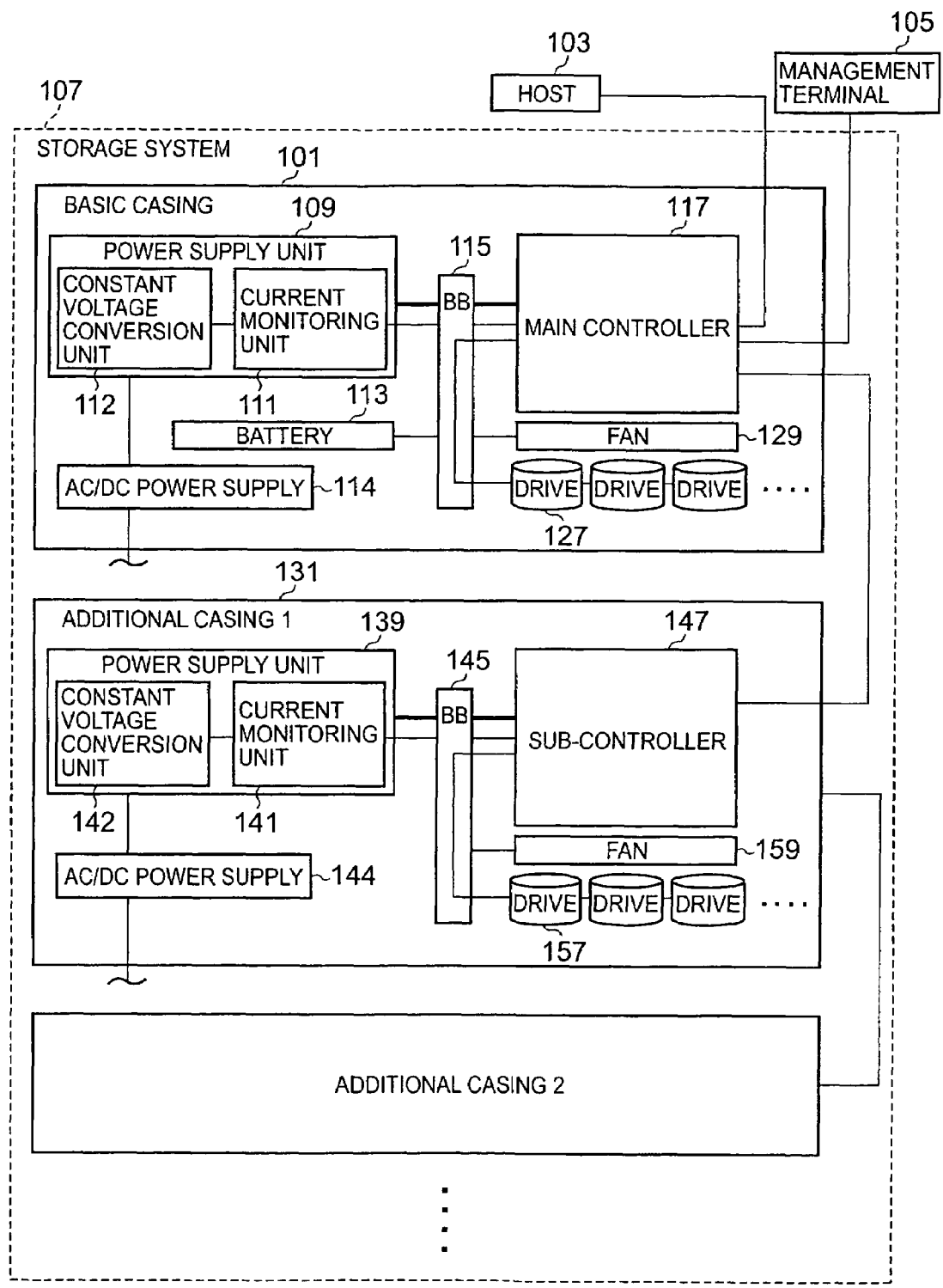
FIG. 1 is a diagram showing an example of the construction of a storage system according to an embodiment of the present invention.

FIG. 1 is a diagram showing an example of the construction of a storage system according to an embodiment of the present invention.

The storage system 107 has connected thereto a host computer 103, which is a type of host device, and a computer (hereinafter "management terminal") 105 for managing the storage system 107.

The host computer 103 issues IO (input/output) commands to the storage system 107. The IO commands are, for example, at least one of write commands for writing data to the storage system, and read commands for reading data from the storage system.

The management terminal 105 is able to set various information in the storage system 107, and receive and store various information from the storage system 107. The function of the management terminal 105 will be described in detail later.

The storage system 107 can be constructed from at least a basic casing 101 out of the basic casing 101 and additional casings 131. In the case that additional casing(s) 131 is/are provided, the number of additional casing(s) 131 can be made to be from 1 upward. The one or more additional casing(s) 131 can be connected to the basic casing 101. In the present embodiment, the word "casing" with regard to the basic casing 101 and the additional casings 131 can include the meaning of a subsystem of the storage system.

The basic casing 101 is a subsystem that has at least a main controller 117 therein, and does not necessarily have to have disk drives 127 therein. Specifically, the basic casing 101 has therein, for example, an AC/DC power supply 114, a power supply unit 109, a back board 115, a battery 113, a fan 129, a plurality of disk drives 127, and the main controller 117.

The power supply unit 109 is a unit that supplies power to the various loads in the basic casing 101 (in FIG. 1, the main controller 117, the fan 129, and the disk drives 127), and has therein a constant voltage conversion unit 112 and a current monitoring unit 111. The constant voltage conversion unit 112 is a circuit that converts a DC voltage from the AC/DC power supply 114 into a constant voltage and applies this constant voltage to each of the loads. The current monitoring unit 111 is a device that monitors (in other words, measures) a current flowing into each of the loads from the constant voltage conversion unit 112. The current monitoring unit 111 is able to report the measured current values to the main controller 117 in response to a command from the main controller 117. The current monitoring unit 111 may alternatively actively report the measured current values to the main controller 117 either periodically or non-periodically.

The battery 113 is a so-called auxiliary power supply, for example an auxiliary power supply for a specific part, more specifically, for example, an auxiliary power supply for a cache memory in the main controller 117.

The fan 129 is for cooling the main controller 117. The fan 129 may also cool another heat-generating part in addition to or instead of the main controller 117.

The back board 115 is a member for electrically connecting the power supply unit 109, the main controller 117, the battery 113, the fan 129, and the disk drives 127, and can be constructed, for example, from one or a plurality of printed wiring board(s) Power is supplied from the power supply unit 109 via the back board 115 to the various loads (the disk drives 127, the fan 129, and the main controller 117).

Each of the disk drives 127 is a hard disk drive in the present embodiment, but may be another type of disk drive (e.g. an optical disk drive) instead.

The main controller 117 can be constructed, for example, from one or a plurality of circuit board(s). The main controller 117 is able to receive an IO command from the host computer 103, and carryout IO processing in accordance with the IO command. Moreover, the main controller 117 is able to receive and store various information from the management terminal 105, and send various information to the management terminal 105. Moreover, the main controller 117 is able to send a command to acquire current values to the current monitoring unit 111 in the power supply unit 109 periodically, and in response to this, receive from the current monitoring unit 111 the current values measured by the current monitoring unit 111.

Each additional casing 131 is a subsystem that has at least disk drives 157 and a sub-controller 147 therein. For each additional casing 131, a construction similar to that for the basic casing 101 can be adopted. In FIG. 1, the reference numeral of each constituent element of the additional casing 131 is designated to be a number obtained by adding 30 to the reference numeral of the corresponding constituent element of the basic casing 101. For example, the reference numeral of the power supply unit in the additional casing 131 is 139, this being a number obtained by adding 30 to the reference numeral 109 of the power supply unit in the basic casing 101. In the following, for the additional casing 131, it is mainly differences to the basic casing 101 that will be described.

There is no battery for a cache memory in the additional casing 131. This is because a cache memory as present in the main controller 117 is not present in the sub-controller 147.

Moreover, in the additional casing 131, instead of the main controller 117, the sub-controller 147 is installed as described above. A fan 159 is thus for cooling the sub-controller 147. The sub-controller 147 can be made to have a simpler construction than the main controller 117.

Figure 2:
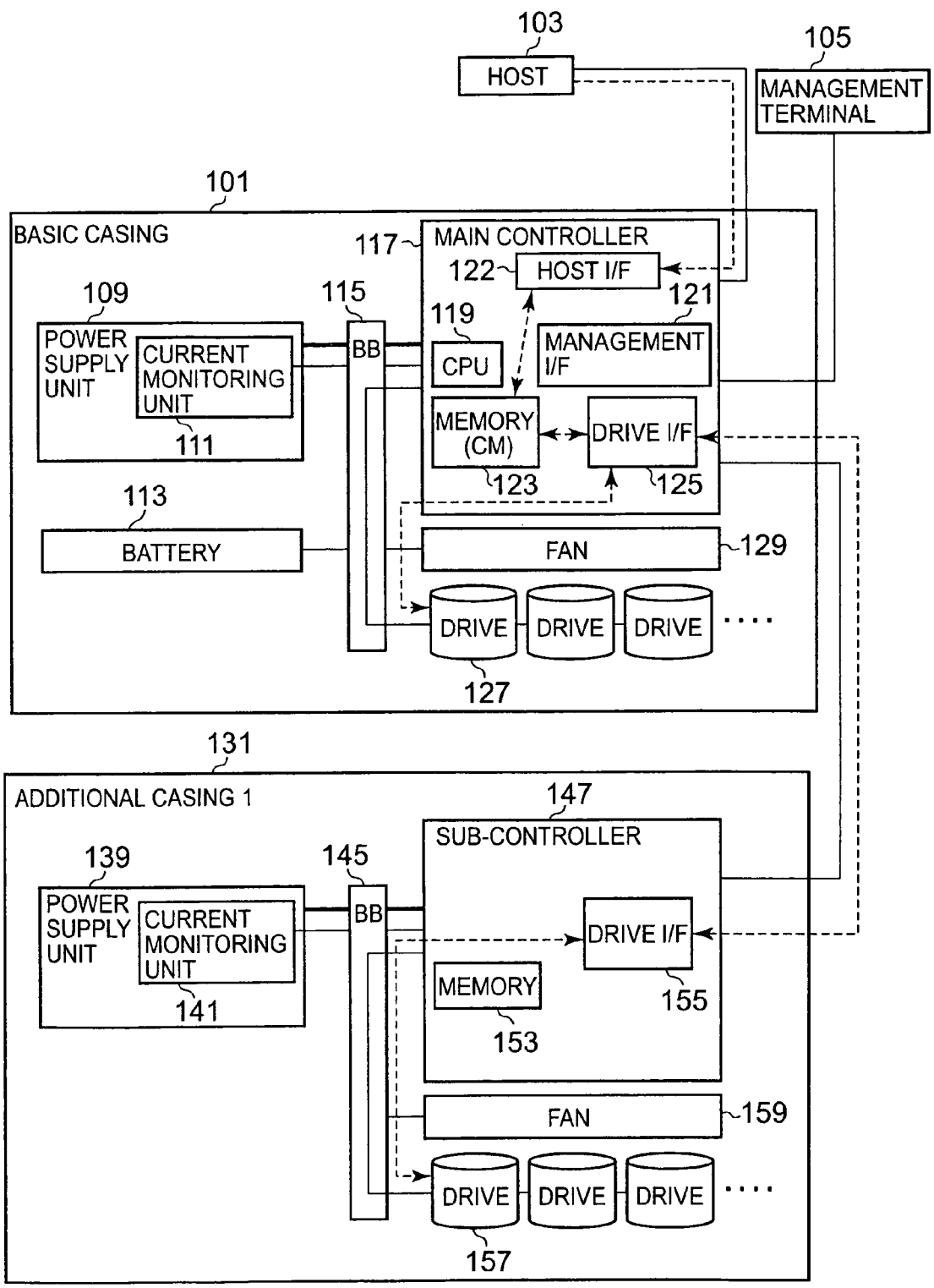
FIG. 2 shows the internal construction of each of a main controller 117 and a sub-controller 147, and the flow of data written and read in accordance with IO commands from a host computer 103.

FIG. 2 shows the internal construction of each of the main controller 117 and the sub-controller 147, and the flow of data written and read in accordance with IO commands from the host computer 103.

The main controller 117 is provided with a host interface unit (hereinafter "host I/F") 122, a management I/F 121, a drive I/F 125, a CPU (central processing unit) 119, and a memory 123. Each of the I/F's can be constructed from a hardware circuit (e.g. LSI (large scale integration)), a computer program, or a combination thereof.

The host I/F 122 controls communication with the host computer 103 (e.g. communication following a fiber channel protocol).

The management I/F 121 controls communication with the management terminal 105 (e.g. communication following an internet protocol).

The drive I/F 125 controls communication with the disk drives 127 (e.g. communication following a fiber channel protocol).

The memory 123 contains the cache memory (CM). The cache memory is able to temporarily store data received from the host computer 103 to be written to a disk drive 127 (hereinafter "write data"), and data read from a disk drive 127 to be sent to the host computer 103 (hereinafter "read data"). The memory 123 can also store various computer programs executed by the CPU 119, and control data referred to by the CPU 119. Examples of the control data are data for drive group management and logical volume management. The data for drive group management can be constructed, for example, from an identifier (ID) for each drive group, and ID's for each of a plurality of disk drives constituting each drive group. The data for logical volume management can be constructed from an ID for each logical volume, and an ID for each drive group having each logical volume. The drive groups are, for example, groups following RAID (Redundant Array of Independent (or Inexpensive) Disks) rules, and are also known as parity groups or array groups.

The sub-controller 147 does not need to have a host I/F 122, a management I/F 121, a cache memory and a CPU 119, but need only have a memory 153 and a drive I/F 155. The sub-controller 147 may be constructed from a purely hardware circuit (e.g. ASIC (application specific integrated circuit)).

Following is a description of an example of the flow of the IO processing.

The CPU 119 analyzes an IO command received from the host I/F 122.

In the case that the CPU 119 determines that the received IO command is a read command, the CPU 119 determines whether or not there is read data in the cache memory (whether or not there is a cache hit). In the case that it is determined that there is read data, the CPU 119 instructs the host I/F 122, and the host I/F 122 reads the read data out from the cache memory, and sends the read data to the host computer 103. On the other hand, in the case that it is determined that there is no read data, the CPU 119 instructs the drive I/F 125, and the drive I/F 125 acquires the read data from the appropriate disk drive 127 (the disk drive 127 corresponding to a location specified in the IO command), and writes this read data into the cache memory. The host I/F 122 then reads the read data out from the cache memory, and sends the read data to the host computer 103.

In the case that the CPU 119 determines that the received IO command is a write command, the CPU 119 determines whether or not an area has been secured in the cache memory (whether or not there is a cache hit). In the case that there is a cache hit, the CPU 119 instructs the host I/F 122, and the host I/F 122 writes write data to the cache memory. After that, the host I/F 122 outputs a completion report to the host computer 103. On the other hand, in the case that there is not a cache hit, the CPU 119 can wait until there is a cache hit. The drive I/F 125 then writes the write data written into the cache memory to the appropriate disk drive 127 (the disk drive 127 corresponding to a location specified in the IO command).

Note that in the above IO processing, in the case that the disk drive is in an additional casing 131, the drive I/F 125 instructs the drive I/F 155 in the additional casing 131, and the drive I/F 155 accesses the appropriate disk drive 157 in the additional casing 131 in accordance with the instruction.

The above is an example of the flow of the IO processing. Following is a description in outline of characteristic features of the present embodiment.

FIG. 3 is a diagram for explaining in outline characteristic features of the present embodiment.

The power supply units 109 and 139 are provided respectively with current monitoring units 111 and 141.

The CPU 119 is able to periodically send a predetermined command to the current monitoring unit 111, so as to acquire the measured current values from the current monitoring unit 111 as shown by the dashed arrow 403.

Moreover, the CPU 119 is able to periodically make a request for current values to the drive I/F 155 in each additional casing 131 via the drive I/F 125 as shown by the dashed arrow 405. The drive I/F 155 is able to send a predetermined command to the current monitoring unit 131 in response to this request, so as to acquire current values from the current monitoring unit 131 as shown by the dashed arrow 407, and send the acquired current values to the CPU 119 as shown by the dashed arrow 405.

Electronic power consumption value rules for the disk drives are stored in the memory 123. The power consumption value rules are power values required for various types of processing. Specifically, examples of the power consumption value rules are the power value consumed when moving a head with a certain seek amount (e.g. within a certain head movement range), and the power value consumed at a certain disk rotational speed.

Moreover, allowed power values are stored in the memory 123. An allowed power value is a threshold value for a power consumption value. The stored allowed power values can be made to be for predetermined units. The predetermined units may be at least one of the storage system 107 overall and the casings. There is no limitation to this, for example other units such as drive groups may be used. The allowed power values for the predetermined units can be instructed from the management terminal 105 to the CPU 119 and set in the CPU 119 as shown by the dashed arrow 401. Moreover, the management terminal 105 can acquire calculated power consumption values and so on as shown by the dashed arrow 401.

The CPU 119 can manage the acquired current values in the memory 123. Specifically, for example, the CPU 119 can store the times of acquisition and the acquired current values for each casing separately in the memory 123.

The CPU 119 can calculate power consumption values from the acquired current values and a predetermined voltage value (e.g. a constant voltage value applied by the power supply unit 109). The CPU 119 can also manage the calculated power consumption values in the memory 123. Specifically, for example, the CPU 119 can store the times of calculation and the calculated power consumption values for each casing separately in the memory 123.

The CPU 119 can then carry out control based on the calculated power consumption values, and the allowed power values and the power consumption value rules stored in the memory 123, such that maximum performance is achieved within a range that the power consumption values do not exceed the allowed power values. This control may be, for example, at least one of IO processing control, cache control, and drive control. IO processing control is control of the IO processing according to an IO command. Cache control is control with regard to reading and writing data from and to the cache memory. Drive control is control with regard to the disk drives 127 and 157. Specifically, such control is, for example, as follows.

(1) IO Processing Control

In the IO processing control, for example, at least one of (1-1) to (1-3) below is-carried out for each IO command.

(1-1) Commencement of the processing according to the IO command is delayed. As a result, disk drive access can be delayed. In other words, accesses to disk drives becoming concentrated in the same time period can be suppressed.

(1-2) Processing of IO commands for sequential access is given priority, with IO commands for random access being delayed. Whether access is sequential or random can be identified from information contained in the IO commands. Moreover, this (1-2) can be carried out in units of a plurality of IO commands. For example, if a first access destination address among a plurality of IO commands continues over a predetermined interval, then it can be determined that the access is sequential, otherwise it can be determined that the access is random.

(1-3) The delay of the processing according to an IO command is set in accordance with the disk rotational speed of the disk drive to be accessed.

(2) Cache Control

In the cache control, for example, at least one of (2-1) and (2-2) below is carried out.

(2-1) The order of data to be destaged from the cache memory (written to a disk drive) is changed. Here, data that is to be written to a disk drive rotating at a normal disk rotational speed (the rotational speed when the disk is being accessed) is prioritized, and data that is to be written to a disk drive for which this is not the case is made to be subsequent. Moreover, in the case that random access arises, reordering into an order such that the access is sequential may be carried out.

(2-2) In the case that reordering of the destaging is not possible, data that is to be written to a first disk drive not rotating at a normal rotational speed is temporarily written to a second disk drive rotating at a normal rotational speed, and then after that, the first disk drive is set to the normal rotational speed, and the data that has been written to the second disk drive is transferred onto the first disk drive. What data to temporarily store where in which disk drive can be recorded in a predetermined storage area, for example a cache control table 215, described later, and can be identified from this table.

(3) Drive Control

In the drive control, for example, at least one of (3-1) to (3-3) below is carried out for each disk drive.

(3-1) The disk rotational speed is changed in accordance with the access frequency. What the access frequency and the current disk rotational speed are for each disk drive is recorded, for example, in a drive control table, described later. The access frequency can be obtained by updating an access count value for a disk drive each time that disk drive is accessed, and resetting the access count value each time a predetermined time period passes. There is/are one or more threshold value(s) for the access frequency, and what disk rotational speed to set can be determined by which threshold value the access frequency is less than.

(3-2) The disk rotational speed is changed in accordance with whether or not there has been access recently. Whether or not there has been access recently can be identified, for example, by referring to the drive control table, described later, an IO processing control module 203 recording in the drive control table the time of receipt of each IO command and the ID of the disk drive to be accessed according to that IO command. Whether or not there has been access recently means, for example, whether or not there has been access within a predetermined past time period from the current time.

(3-3) The disk rotational speed of a disk drive for which there has been zero access over a predetermined time period is set to zero. The power supply of such a disk drive may also be turned off.

The above are examples of the various types of control. Note that other than such control, for example control as follows may be carried out. That is, the CPU 119 may identify a required device, turn on the power supply of only the identified device, and turn off the power supply of that device when no longer needed. The device referred to here may be a casing, or may be a disk drive. The required device can be made to be a device that is to be accessed. For example, in the case of copying (e.g. backing up) data, required devices are the device having the data that is the copy source, and the device that is the copy destination.

Following is a more detailed description of characteristic features of the present embodiment.

FIG. 4 is a diagram for explaining processing carried out by the CPU 119.

An allowed power value table 163 is stored in the memory 123. The allowed power value table 163 has recorded therein, for example, an allowed power value for the storage system 107 overall, and an allowed power value for each of the casings, as shown in FIG. 5.

Computer programs executed by the CPU 119 are a power monitoring control module 201, the IO processing control module 203, a cache control module 205, and a drive controller 207. In the following, when "computer program" is the subject, in actuality this refers to the processing carried out by the CPU executing the computer program.

The power monitoring control module 201 can acquire measured current values, calculate power consumption values from the acquired current values, and based on the calculated power consumption values and the allowed power value table 163, carry out at least one of IO processing control, cache control, and drive control. During IO processing control, an IO control table 213 can be referred to. During cache control, the cache control table 215 can be referred to. During drive control, a drive control table 217 can be referred to. The power monitoring control module 201 can carryout the control based on the table referred to. Moreover, after carrying out the control, the power monitoring control module 201 can update the table referred to.

Each of the tables 213, 215 and 217 is, for example, a temporary table. The IO control table 213 has recorded therein, for example, for each IO command, at least one of an ID of the IO command, the order received from the host computer 103, an access destination address (e.g. a disk drive ID or an access destination sector number) according to the IO command, and an IO processing commencement delay time period length. The cache control table 215 has recorded therein, for example, at least one of a cache area ID, whether or not free, and a destaging destination address. Moreover, there may also be stored an ID and address of a disk drive to which data has been destaged temporarily, and an ID and address of a disk drive to which that data was originally to be destaged. The drive control table 217 has recorded therein, for example, for each disk drive, at least one of the ID of the disk drive, the ID of a drive group to which the disk drive belongs, the on/off state of the power supply of the disk drive, and the current disk rotational speed.

The IO processing control module 203 can carry out control of processing according to an IO command from the host computer 103 based on the calculated power consumption values. At this time, the IO processing control module 203 can update the IO control table 213.

The cache control module 205 can carry out control of reading and writing from and to the cache memory based on the calculated power consumption values. At this time, the cache control module 205 can update the cache control table 215.

The drive control module 207 can carry out control of the disk drives based on the calculated power consumption values. At this time, the drive control module 207 can update the drive control table 217.

Following is a detailed description of an example of the processing carried out by each of the various controllers 201, 203, 205 and 207.

Figure 6:
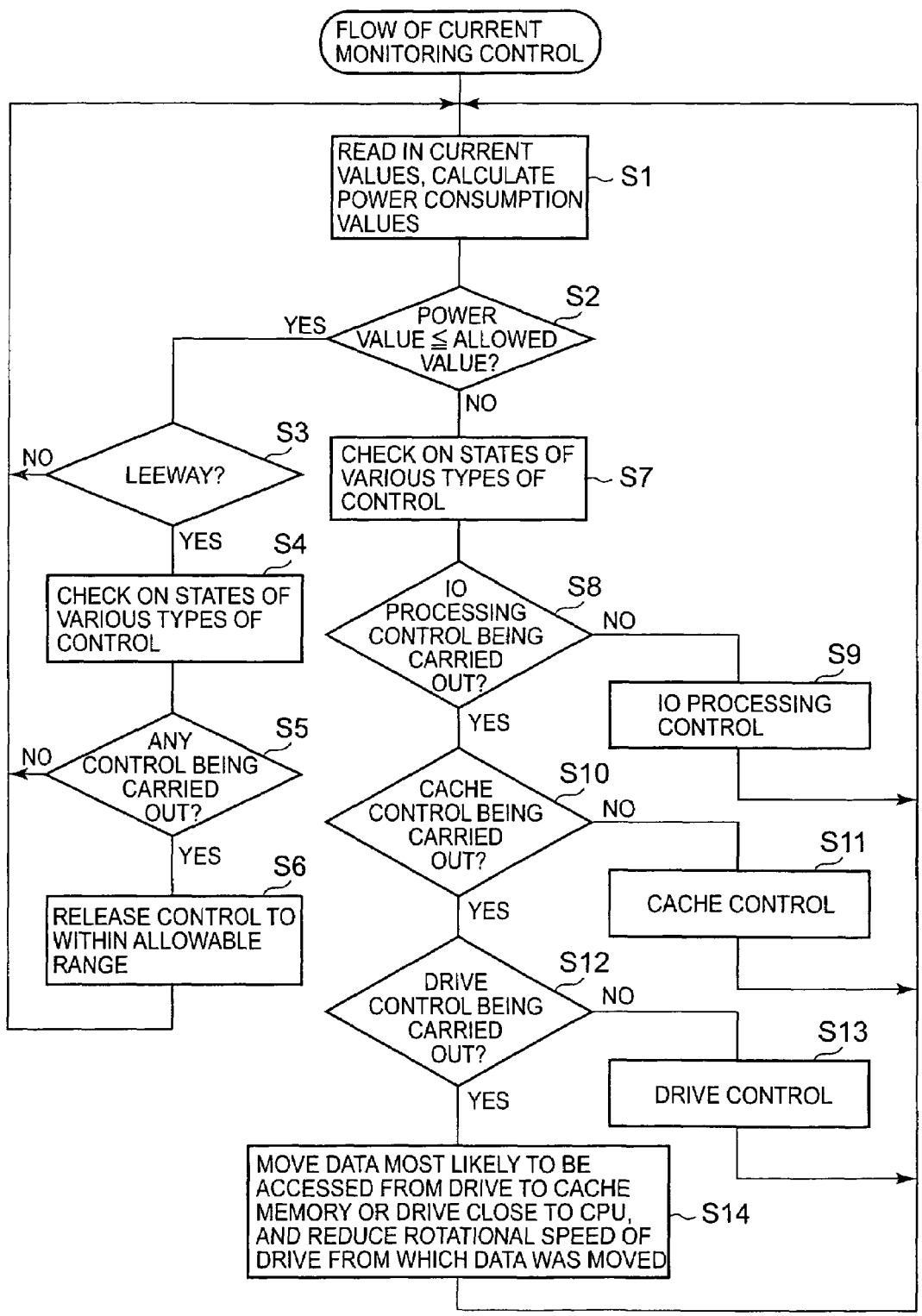
FIG. 6 shows an example of the flow of processing carried out by a power monitoring control module 201.

FIG. 6 shows an example of the flow of the processing carried out by the power monitoring control module 201.

The power monitoring control module 201 periodically acquires current values from the current monitoring units 111 and 141, and calculates power consumption values for the predetermined units from the acquired current values and the predetermined voltage (step S1). Here, the predetermined units are the storage system 107 overall, and each of the casings 101 and 131.

The power monitoring control module 201 determines whether or not each of the calculated power consumption values is not more than the allowed power value recorded in the allowed power value table 163 (S2). Here, if there is a unit for which the power consumption value is not more than the allowed power value (YES at S2), then the processing of S3 is carried out for that unit. If there is even one unit for which the power consumption value exceeds the allowed power value (NO at S2), then the processing of S7 is carried out for that unit.

In S3, the power monitoring control module 201 determines whether or not the difference between the calculated power consumption value and the allowed power value is at least a predetermined value. If the difference is less than the predetermined value (NO at S3), then the power monitoring control module 201 carries out S1 again, whereas if the difference is at least the predetermined value (YES at S3), then the power monitoring control module 201 carries out S4.

In S4, the power monitoring control module 201 checks on the states of the IO processing control, the cache control and the drive control (e.g. whether or not each of the IO processing control, the cache control and the drive control is being carried out). This can be done, for example, by referring to the various tables 213, 215 and 217. If, as a result, it is determined that none of these types of control is being carried out (NO at S5), then S1 is returned to, whereas if it is determined that at least one these types of control is being carried out (YES at S5), then S6 is carried out.

In S6, the power monitoring control module 201 releases at least one of the IO processing control, the cache control and the drive control within an allowable range. Here, "within an allowable range" means that each power consumption value is not more than the allowed power value, and yet the difference between each power consumption value and the allowed power value is as small as possible. That is, this means that each power consumption value is made to be not more than the allowed power value, and yet also, as far as possible, it is made to be that the performance is not degraded. In S6, an example of releasing the IO processing control is shortening the delay time period for the processing carried out according to the IO command (e.g. setting this delay time period to 0s). An example of releasing the cache control is stopping changing the order of destaging the data in the cache memory. An example of releasing the drive control is setting the disk rotational speed of a disk drive rotating at a speed lower than the normal rotational speed to the normal rotational speed.

Note that this release of control in S6 can be carried out, for example, based on the power consumption value rules described earlier. That is, the power consumption value rules can have recorded therein, for example, the relationship between the seek amount and the power consumption value or the relationship between the disk rotational speed and the power consumption value, and it can be identified from these rules, for example, how much the power consumption value will rise if the rotational speed of a disk drive is increased from a low speed to the normal rotational speed. By releasing control based on the power consumption value rules, the performance can be increased such that each power consumption value does not exceed the allowed power value. In the case that such release of control is carried out in S6, the power monitoring control module 201 can update (e.g. delete) information relating to the control that has been released in the tables 213, 215 and 217.

In S7, the power monitoring control module 201 can carry out the same processing as in S4.

In the case that the power monitoring control module 201 determines that the IO processing control is not being carried out (NO at S8), the power monitoring control module 201 carries out the IO processing control (S9).

Moreover, in the case that the power monitoring control module 201 determines that the IO processing control is being carried out but the cache control is not being carried out (YES at S8, NO at S10), the power monitoring control module 201 carries out the cache control (S11).

Furthermore, in the case that the power monitoring control module 201 determines that the IO processing control and the cache control are being carried out but the drive control is not being carried out (YES at S10, NO at S12), the power monitoring control module 201 carries out the drive control (S13).

In the case that the power monitoring controller 201 determines that all of the types of control are being carried out (YES at S12), then in the case that data for which the access frequency is at least a predetermined value is stored in a disk drive 157 in an additional casing 131, the power monitoring control module 201 moves this data from that disk drive 157 to the cache memory or a disk drive 127 in the basic casing 101, and sets the disk rotational speed of the disk drive 157 from which the data was moved to a speed lower than the normal rotational speed (e.g. zero) (S14). At this time, the disk drive 127 can be made to be a disk drive as close as possible to the main controller 117. Moreover, in addition to this movement, in the case, for example, that the access frequency is lower for the disk drive 127 in the basic casing 101, it is possible to move data in this disk drive 127 to the disk drive 157 in the additional casing 131, and then reduce the rotational speed of the disk drive 157. Through this processing, the achievement of both power saving and good performance is expected to be improved.

The above is an example of the processing carried out by the power monitoring control module 201. Note that in the above processing, determination was carried out with priority given in the order IO processing control being carried out or not, cache control being carried out or not, drive control being carried out or not, but the order of priority is not limited to this. Moreover, there may be no order of priority. However, to maintain the drive access performance in a range such that an allowed power value is not exceeded, it is thought to be necessary to maintain the disk rotational speed at a maximum, and to realize this, it is thought to be desirable to carry out the control in the above order (with the above order of priority). However, in the case, for example, that the difference between a power consumption value and an allowed value is less than a predetermined value, and there is an unused drive (e.g. a drive for which the access frequency is less than a predetermined value), it is thought that the frequency of carrying out the control can be reduced best by increasing the difference between the power consumption value and the allowed value by further reducing the rotational speed of (e.g. stopping) that drive.

Figure 7:
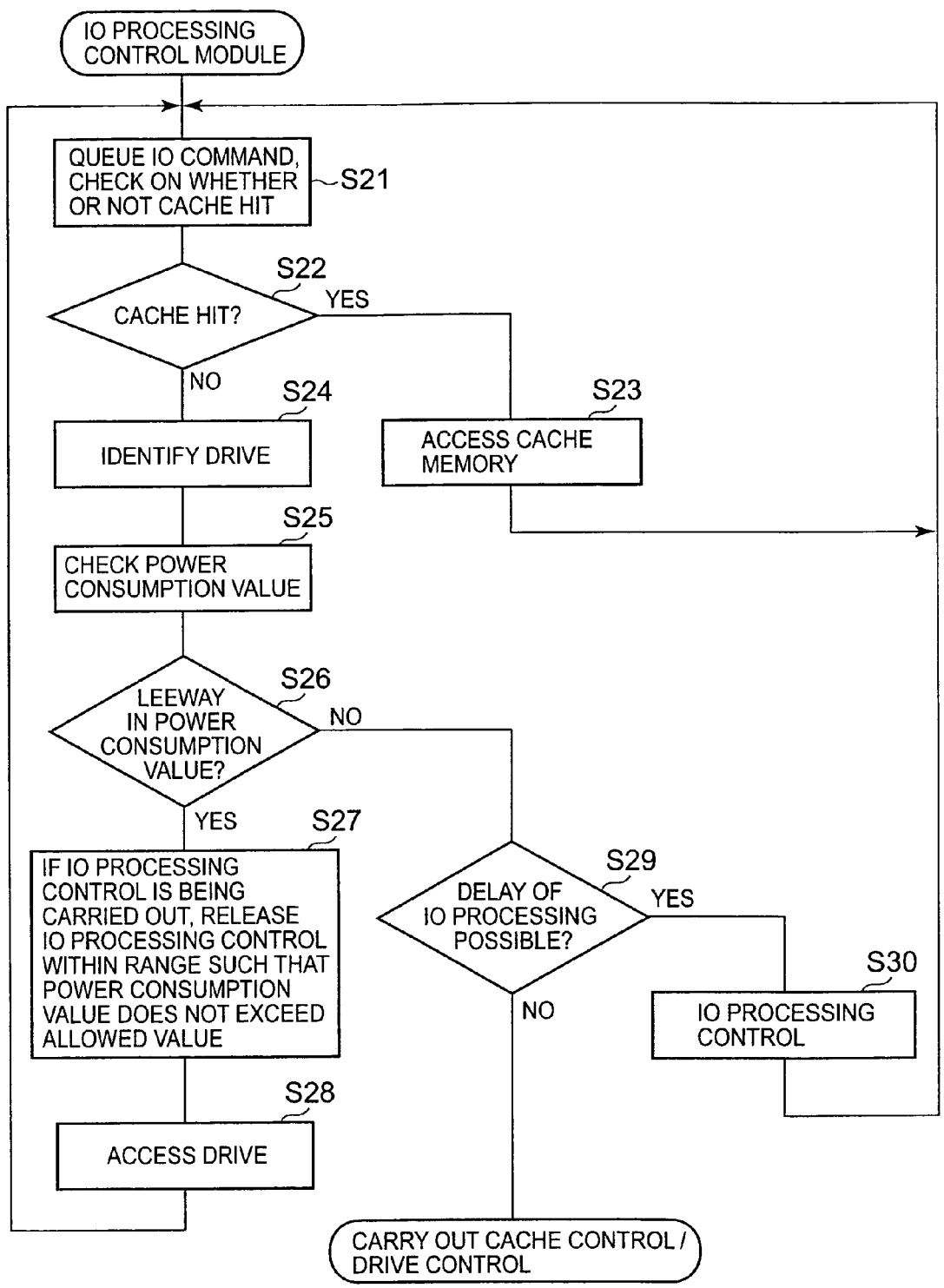
FIG. 7 shows an example of the flow of processing carried out by an IO processing control module 203.

FIG. 7 shows an example of the flow of the processing carried out by the IO processing control module 203.

This processing is, for example, commenced each time an IO command is received.

Upon receiving an IO command, the IO processing control module 203 carries out queuing into a predetermined buffer (S21), and determines whether or not there is a cache hit (S22). In the case that the IO command is a write command, a cache hit means that a cache area has been secured, and in the case that the IO command is a read command, a cache hit means that read data corresponding to the read command is present in a cache area.

In the case that it is determined that there is a cache hit (YES at S22), the IO processing control module 203 accesses the cache memory (S23).

On the other hand, in the case that it is determined that there is not a cache hit (NO at S22), the IO processing control module 203 identifies from the IO command which disk drive is to be accessed (S24). At this time, if the identified disk drive is not at the normal rotational speed (e.g. is at a low rotational speed or is in a state with the power supply off), then the IO processing control module 203 may set the disk drive to the normal rotational speed in advance.

The IO processing control module 203 checks each power consumption value, and compares the power consumption value to the allowed power value (S25). The power consumption value is the value calculated by the power monitoring control module 201 and written in the memory 123.

If, as a result, the power consumption value is not more than the allowed power value (YES at S26), then if the IO processing control is being carried out, the IO processing control module 203 can release the IO processing control within a range such that the power consumption value does not exceed the allowed power value (S27). Whether or not the IO processing control is being carried out can be identified from the IO control table 213. When the IO processing control is released, the IO control table 213 can be updated. After that, the IO processing control module 203 accesses the disk drive identified in S24 (S28).

In S26, if the power consumption value exceeds the allowed power value (NO at S26), then the IO processing control module 203 determines whether or not delay of the IO processing is possible, and if possible (YES at S29), carries out IO processing control (S30), whereas if not possible, causes at least one of the cache control module 205 and the drive control module 207 to be carried out. Note that whether or not delay of the IO processing is possible can be determined, for example, through whether the IO timeout period length for the host computer 103 (the length of the time period from the host computer 103 issuing the IO command to a predetermined response being received) is at least or less than a predetermined time period. In this case, if the IO timeout period length is at least the predetermined time period, then it can be determined that delay of the IO processing is possible.

Figure 8:
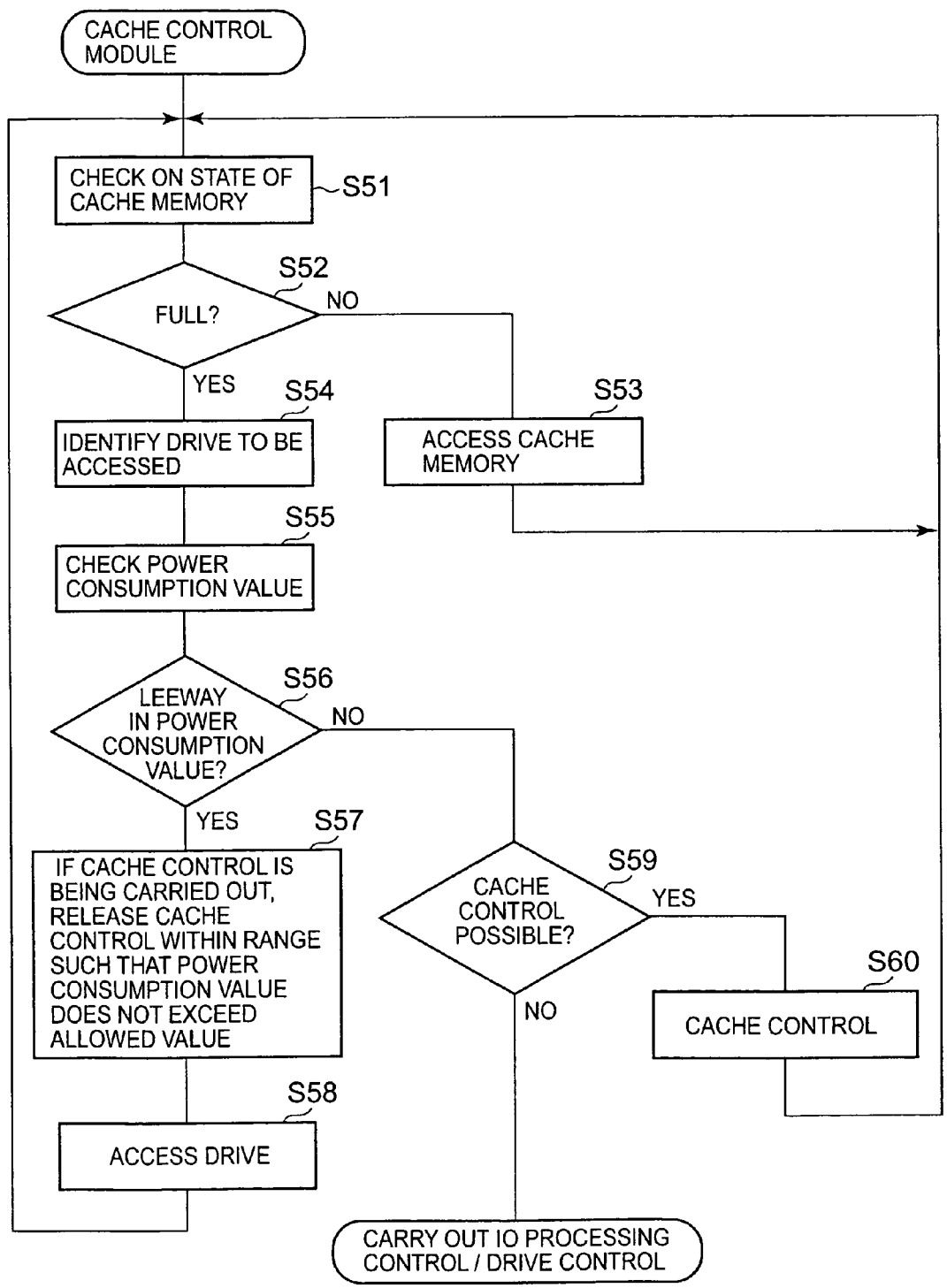
FIG. 8 shows an example of the flow of processing carried out by a cache control module 205.

FIG. 8 shows an example of the flow of the processing carried out by the cache control module 205.

This processing can be carried out, for example, in the case that the state of the cache memory is monitored periodically and it is detected that the cache memory is full, or in the case of controlling the order of writing to drives. In the case of the former, the processing can be commenced from S54, described below.

The cache control module 205 checks on the state of the cache memory (S51).

If, as a result, there is a free cache area (NO at S52), the cache control module 205 accesses the free cache area (S53).

On the other hand, if the result of S51 is that all of the cache areas are being used (YES at S52), then the cache control module 205 identifies the disk drive that is to be accessed (S54), and compares each calculated power consumption value with the allowed power value (S55).

If, as a result, the power consumption value is not more than the allowed power value (YES at S56), then if the cache control is being carried out, the cache control module 205 can release the cache control within a range such that the power consumption value does not exceed the allowed power value (S57). Whether or not the cache control is being carried out can be identified from the cache control table 215. When the cache control is released, the cache control table 215 can be updated. After that, the cache control module 205 accesses the disk drive identified in S54 (S58).

In S56, if the power consumption value exceeds the allowed power value (NO at S56), then the cache control module 205 determines whether or not cache control is possible, and if possible (YES at S59), carries out the cache control (S60), whereas if not possible, causes at least one of the IO processing control module 203 and the drive control module 207 to be carried out. Note that whether or not the cache control is possible can be determined, for example, through whether or not the power values can be adjusted by changing the order of destaging data in the cache memory. This determination can be carried out, for example, from the results of simulation using a predetermined algorithm.

Figure 9:
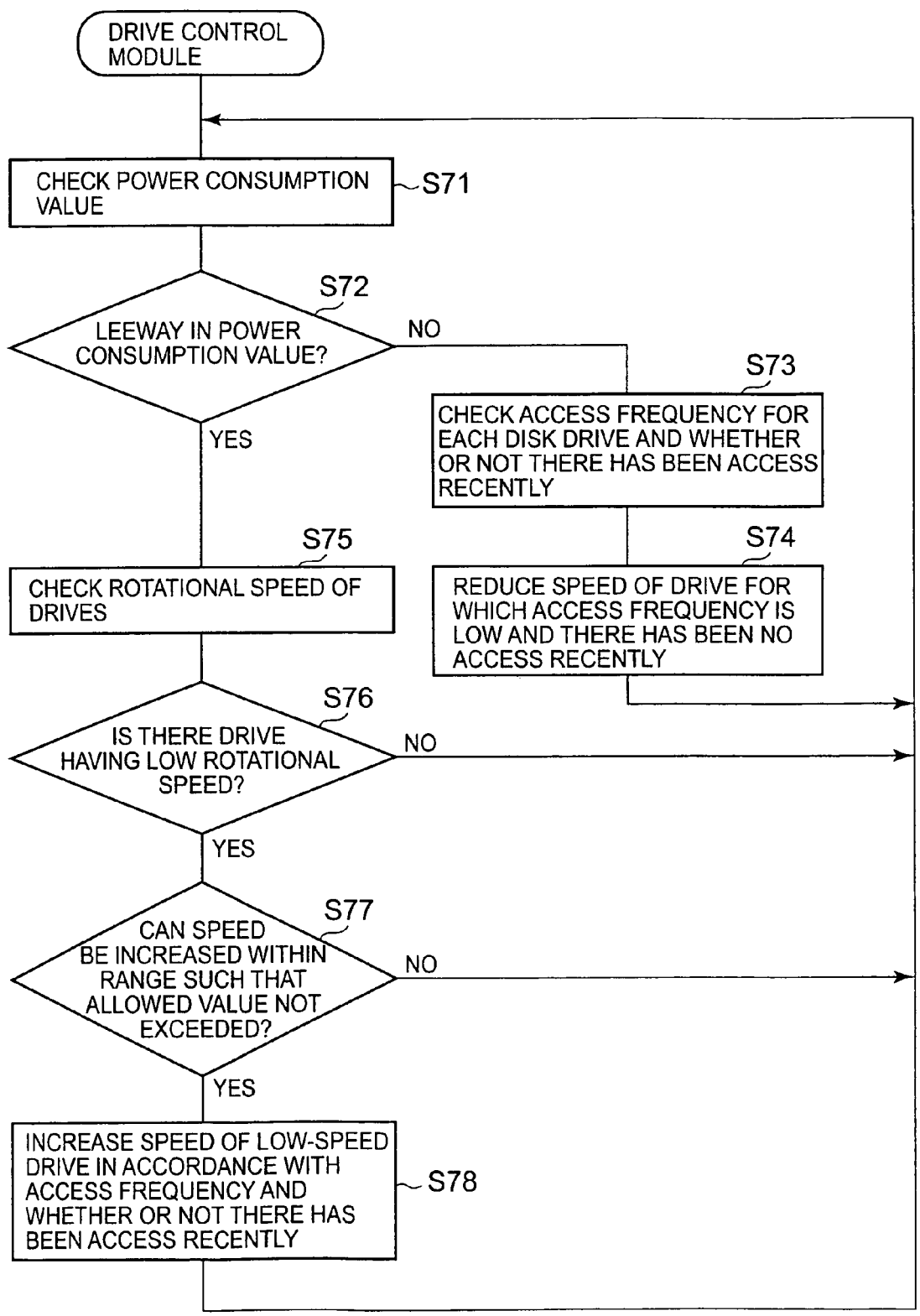
FIG. 9 shows an example of the flow of processing carried out by a drive control module 207.

FIG. 9 shows an example of the flow of the processing carried out by the drive control module 207.

This processing can be carried out, for example, in the case that it is necessary to reduce a power consumption value to not more than a predetermined value, or in the case that a power consumption value cannot be made to be not more than the allowed power value through the IO processing control or the cache control.

The drive control module 207 compares each calculated power consumption value with the allowed power value (S71).

If, as a result, the power consumption value exceeds the allowed power value (NO at S72), then the drive control module 207 checks the access frequency for each disk drive and whether or not there has been access recently, and reduces the disk rotational speed of a disk drive for which the access frequency is not more than a predetermined value and there has been no access recently (S74). Whether or not there has been access recently can be identified, for example, by the drive control module 207 recording the most recent access time for each of the disk drives in the drive control table 217. "No access recently" means that the most recent access time and the current time are separated by at least a predetermined value.

If the result of S71 is that the power consumption value is not more than the allowed power value (YES at S72), then the drive control module 207 checks the current disk rotational speed of each of the disk drives by referring to the drive control table 217.

If the result is that there is a disk drive having a low rotational speed (YES at S76), then the drive control module 207 determines from the power consumption value, the allowed power value and the power consumption value rules whether or not the disk rotational speed can be increased within a range such that the power consumption value does not exceed the allowed power value (S77). In the case that the result is that it is determined that this can be done (YES at S77), the drive control module 207 issues an instruction to a low-speed disk drive to increase the disk rotational speed, this being in accordance with the access frequency and whether or not there has been access recently (S78). In this step S78, out of low-speed disk drives, the disk drive for which the access frequency is highest and/or the most recent access time is shortest is increased in speed. The increasing in speed refers, for example, to setting to a rotational speed at least faster than the current disk rotational speed, and specifically means, for example, setting to the normal rotational speed or a rotational speed close thereto. Moreover, "low-speed" includes the rotational speed being zero, i.e. the disk drive being stopped.

Figures 10, 11:
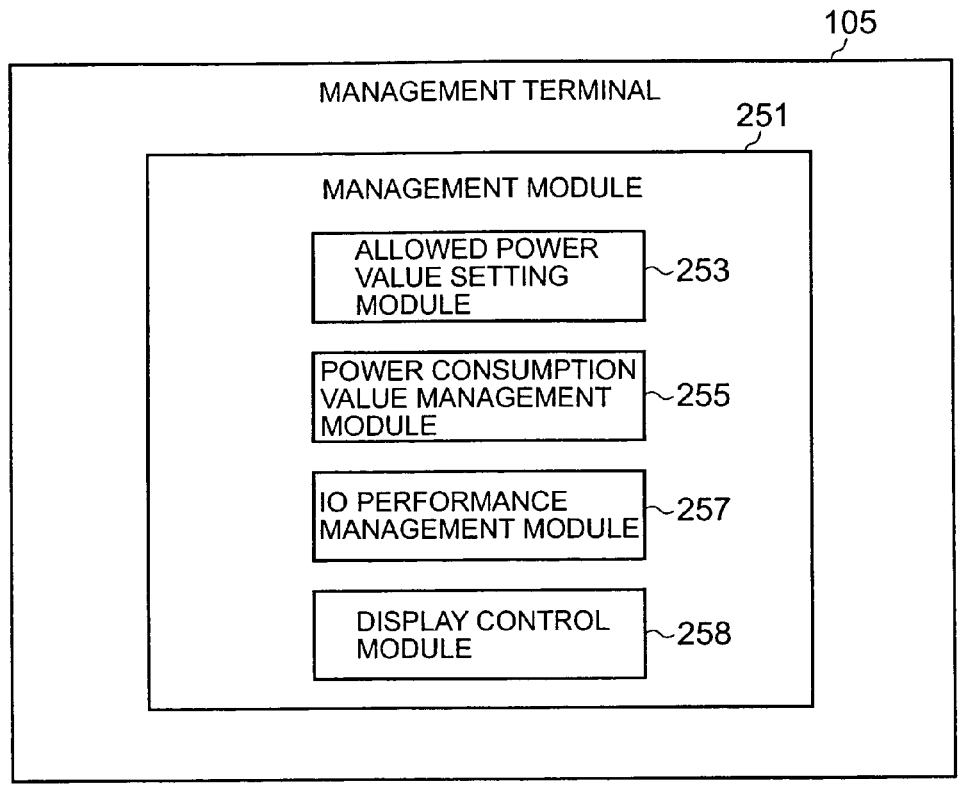
FIG. 10 shows an example of the logical configuration of a management terminal 105.
FIG. 11 shows an example of the configuration of an allowed power value table 259 that can be stored by the management terminal 105.

FIG. 10 shows an example of the logical configuration of the management terminal 105.

In the CPU of the management terminal 105, for example a management module 251 is executed. The management module 251 is a computer program for carrying out management of the storage system 107, and has therein an allowed power value setting module 253, a power consumption value management module 255, and IO performance management module 257, and a display control module 258.

The allowed power value setting module 253 is a program module for setting the allowed power values into the storage system 107. The allowed power value setting module 253, for example, displays a GUI (graphical user interface), and receives the allowed power values from an administrator via the GUI. The administrator can input the allowed power values with importance attached to either power saving or performance. The allowed power value setting module 253 sends the allowed power values inputted from the administrator to the storage system 107. As a result, the allowed power value table 163 is stored in the memory 123 in the basic casing 101. The allowed power values can be received for predetermined units (the storage system and each of the casings). Moreover, the allowed power value setting module 253 can store a table 259 showing the received allowed power values (see FIG. 11) in a storage resource (e.g. a memory) in the management terminal 105. Moreover, the allowed power value setting module 253 can receive allowed power values for each time period separately or for each usage separately, and can set the allowed power values in the storage system 107 for each time period separately or for each usage separately. Here, "for each time period separately" indicates referring to what allowed power value for what time period. Moreover, "for each usage separately" indicates referring to what allowed power value in the case of what usage (e.g. copying between casings, or copying within a casing). When referring to the allowed power values, the CPU 119 in the basic casing 101 can refer to the allowed power values in accordance with the current time or the processing being carried out (the usage).

The IO performance management module 257 acquires IO performance from the storage system 107, and stores the acquired IO performance in the storage resource in the management terminal 105. Here, the "IO performance" indicates the history of the number of IO processing instances (e.g. the number of IO processing instances in each time period). The IO processing control module 203 of the storage system can record the history of the number of IO processing instances in the memory 123.

The power consumption value management module 255 acquires the calculated power consumption values at each time from the storage system 107, and stores the acquired power consumption values for each time in the storage resource in the management terminal 105.

The display control module 258 can identify the highest value and the lowest value out of the current power consumption values or the power consumption values up to now from the storage resource, and display the identified values. Moreover, the power consumption value management module 255 can display the relationship between the IO performance and the power consumption values at each time. Specifically, for example, the power consumption value management module 255 can display superimposed on one another in the same display area (e.g. an area having the same vertical axis and horizontal axis) a graph showing changes in the number of IO processing instances by time period, and a graph showing changes in the power consumption values by time period. As a result, the administrator can grasp at a glance the relationship between the IO performance and the power consumption values.

The present embodiment has been described above.

According to the present embodiment, each of the IO processing control, the cache control, and the drive control is released within a range such that a power consumption value does not exceed an allowed power value. As a result, both power saving and good performance can be achieved.

For the present embodiment, several variations can be envisaged. Following is a description of several variations of the present embodiment. In the following, differences to the embodiment described above are mainly described, with description of points common to the embodiment described above being omitted or abbreviated.

<First Variation>

As shown in FIG. 12, there are a plurality of drive groups A to D in one casing, and the disk rotational speed is controlled taking each drive group as a unit. In FIG. 12, the numbers in brackets are the rotational speed, i.e. the number of rotations per unit time. In the example of FIG. 12, the drive group A is at the normal rotational speed, and the other groups are at a low speed. Of these, drive group C is at the highest speed (taken as low rotational speed 1), drive group D is at the next highest speed (taken as low rotational speed 2), and drive group B is at the lowest speed (stopped). Incidentally, FIG. 13 shows drive groups A and B being in a first casing, and drive groups C and D being in a second casing. That is, in this first variation, the plurality of drive groups to be controlled may be in a single drive group, or may be in a plurality of casings.

At least one of the power monitoring control module 201 and the drive control module 207 (in the following the power monitoring control module 201 is taken as an example) is able to carry out the following processing.

(1) In the case that there is no leeway in a power consumption value relative to the allowed power value (e.g. in the case that the power consumption value exceeds the allowed power value).

The power monitoring control module 201 checks the access frequency and the most recent access time for each of the drive groups A, B, C and D. Moreover, the power monitoring control module 201 calculates, based on the power consumption value rules, how much the disk rotational speeds should be reduced overall to produce leeway in the power consumption value relative to the allowed power value. The power monitoring control module 201 then allots the calculated disk rotational speeds to the drive groups.

Specifically, for example, in the case that the access frequency for drive group A is low (e.g. not more than a predetermined value), the power monitoring control module 201 reduces the disk rotational speed for drive group A (e.g. sets this disk rotational speed to low rotational speed 1, low rotational speed 2, or stopped) Moreover, for example, in the case that the access frequency for drive group C is low, the power monitoring control module 201 reduces the disk rotational speed for drive group C (e.g. sets this disk rotational speed to low rotational speed 2 or stopped). Moreover, for example, in the case that the access frequency for drive group D is low, the power monitoring control module 201 reduces the disk rotational speed for drive group D (e.g. sets this disk rotational speed to a yet lower rotational speed or stopped). Note that in the case of reducing the speed for drive group C or D, the power monitoring control module 201 can move data in at least one of drive groups C and D into a free area in drive group A, which is at the normal rotational speed, and then reduce the rotational speed for the drive group from which the data was moved by a calculated amount. In this case, what data has been moved to which disk can be recorded in a predetermined management table, and if the disk from which the data was moved happens to be accessed, then the location of the disk to which the data was moved can be identified from the management table, and the identified location can be accessed.

(2) In the case that there is leeway in a power consumption value relative to the allowed power value (e.g. in the case that the power consumption value is not more than the allowed power value, and the difference between the power consumption value and the allowed power value is at least a predetermined value).

The power monitoring control module 201 checks the access frequency and the most recent access time for each of the drive groups A, B, C and D. Moreover, the power monitoring control module 201 calculates, based on the power consumption value rules, how much the disk rotational speeds can be increased overall to increase the power consumption value within the range of the allowed power value and thus improve the performance. The power monitoring control module 201 then allots the calculated disk rotational speeds to the drive groups.

Specifically, for example, in the case that there is to be access to drive group B, the power monitoring control module 201 increases the disk rotational speed for drive group B (e.g. sets this disk rotational speed to low rotational speed 1, low rotational speed 2, or the normal rotational speed). Moreover, for example, in the case that there is to be access to drive group C, the power monitoring control module 201 increases the disk rotational speed for drive group C (e.g. sets this disk rotational speed to the normal rotational speed). Moreover, for example, in the case that there is to be access to drive group D, the power monitoring control module 201 increases the disk rotational speed for drive group D (e.g. sets this disk rotational speed to low rotational speed 1 or the normal rotational speed). Moreover, for example, the power monitoring control module 201 can set any of drive groups B to D to the normal rotational speed depending on the difference between the power consumption value and the allowed power value. Moreover, in the case that data in drive group B, C or D is moved to drive group A, and the disk from which the data was moved is set to the normal rotational speed, the power monitoring control module 201 can return this data from drive group A to another one of drive groups B, C and D.

<Second Variation>

Figure 14:
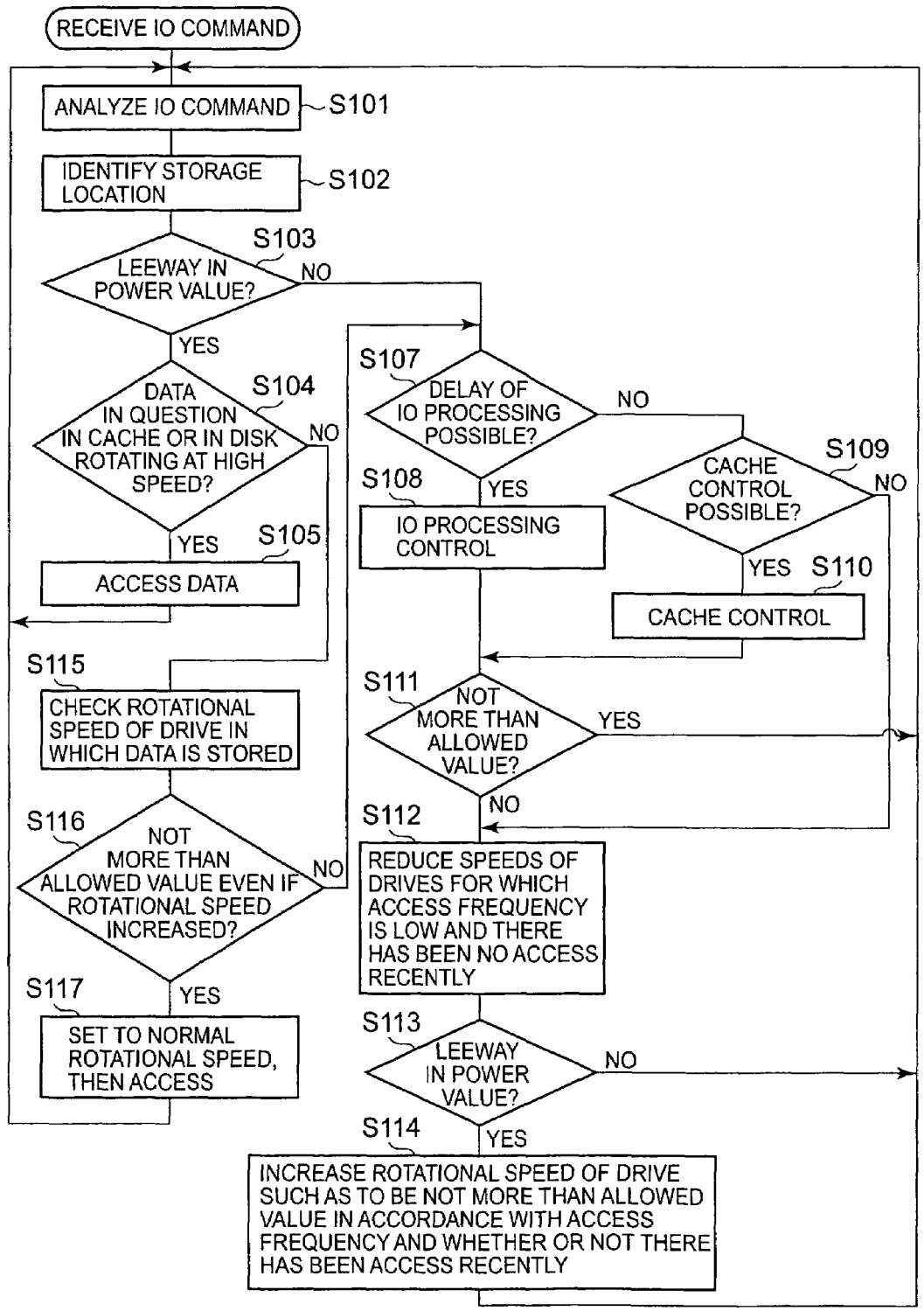
FIG. 14 shows an example of processing carried out in a second variation of the embodiment of the present invention.

FIG. 14 shows an example of processing carried out in a second variation of the embodiment of the present invention. This processing is a variation of the processing carried out by the IO control module (this term is also sometimes used in the other variations), which includes the IO processing control module 203, the cache control module 205 and the drive control module 207. Note that in FIG. 14, the case that the IO command is a read command is taken as an example, but application is also possible in the case that a write command.

The IO control module analyzes the IO command from the host computer 103 (S101), and identifies where the read data corresponding to the IO command is (S102).

The IO control module compares a calculated power consumption value with the allowed power value, and if there is leeway in the power consumption value relative to the allowed power value (YES at S103), determines whether or not the read data is in the cache memory or a disk drive rotating at the normal rotational speed (S104), and if so (YES at S104), reads out the read data therefrom (S105). Otherwise (NO at S104), the IO control module checks the rotational speed of the disk drive in which the read data is stored (S115), and if this rotational speed is low, determines whether or not the power consumption value will still not exceed the allowed power value even if the rotational speed is increased (S116). In S116, specifically, for example, the IO control module determines whether or not a predicted power consumption value increased due to the rotational speed being increased (this predicted power consumption value is, for example, the value obtained by adding, to the power consumption value before the rotational speed is increased, the increase in the power consumption value due to the rotational speed being increased) still does not exceed the allowed power value. In the case that it is determined that the predicted power consumption value does not exceed the allowed power value, the IO control module returns the disk drive to the normal rotational speed, and then acquires the read data from the disk drive (S117).

In the case that it is determined in S116 that the predicted power consumption value does exceed the allowed power value (NO in S116), or it is determined in S103 that there is no leeway in the power consumption value relative to the allowed power value (NO at S103), S107 is carried out.

In S107, the IO control module determines whether or not delay of IO processing is possible, and if determined to be impossible (NO at S107), determines whether or not cache control is possible (S109), and if determined to be possible (YES at S109), carries out the cache control (S110). If the cache control is determined in S109 to be impossible (NO at S109), then S112 is carried out.

In S107, if it is determined that delay of the IO processing is possible (YES at S107), then the IO control module carries out IO processing control (S108).

After S108 or S110, if the power consumption value exceeds the allowed power range (NO at S111), then the IO control module reduces the rotational speeds of all of the disk drives for which the access frequency is low and there has been no access recently (S112), and if as a result leeway arises in the power consumption value with regard to the allowed power range (YES at S113), then the IO control module increases, within a range such that the power consumption value does not exceed the allowed power value, the disk rotational speed of a disk drive whose speed has been reduced, this being in accordance with the access frequency and whether or not there has been access recently (S114).

<Third Variation>

In the third variation, as shown in FIG. 15, drive groups A and B in the basic casing 101 are made to be at the normal rotational speed, and drive groups C and D in an additional casing 131 are made to be at low speed.

In this third variation, when a low-speed disk drive is to be accessed, control is carried out as follows.

In the case that the IO command is a command to write data to a disk drive in drive group C, the IO control module checks on the state of the cache memory and the rotational speed of the disk drive in drive group C.

In the case that it is identified that the disk drive is stopped and the cache memory is full, the IO control module temporarily stores the write data in the drive group A or B which is at the normal rotational speed, and sends a completion report to the host computer 103.

When the IO control module detects that the drive group C has started up (reached the normal rotational speed), the IO control module reads the temporarily stored data out from the drive group A or B, and writes the read out data to the started up drive group C.

The above s an example of the control in the case that a low-speed drive is accessed.

Moreover, in this third variation, cache destaging control can be carried out as follows.

In the case that the IO control module identifies that the cache memory is full, of the data present in the cache memory, the IO control module identifies data that has a low access frequency (e.g. an access frequency not more than a predetermined value) and is old (e.g. an update time is at least a predetermined time period before the current time), and determines the storage locations (destaging destinations) for the identified data. This can be done, F for example, by referring to the cache control table 215.

In the case that the identified storage locations are the drive groups A and D, the IO control module checks on the rotational speed for each of the drive groups A and D. As a result, the IO control module gives priority to storing data in the drive group having the faster rotational speed, for example drive group A which is at the normal rotational speed. That is, the IO control module gives priority to destaging the data for which the drive group A is the storage location.

At this time, the IO control module compares a power consumption value with the allowed power value, and if there is leeway in the power consumption value relative to the allowed power value, may control the rotational speed for the drive group D to the normal rotational speed before data has finished being destaged to the drive group A, and then destage data to the drive group D after the destaging of data to the drive group A has been completed. Moreover, the IO control module may temporarily destage the data for the drive group D to the drive group A, and then subsequently (e.g. after the rotational speed for the drive group D has become the normal rotational speed) move the data from the drive group A to the drive group D.

In this way, when a low-speed disk drive is to be accessed, the IO control module can carry out control optimizing the data access order.

<Fourth Variation>

In the fourth variation, various processing can be carried out upon storage system startup, upon a casing and/or disk drive being added and/or removed, and upon a disk drive being blocked.

Figure 16:
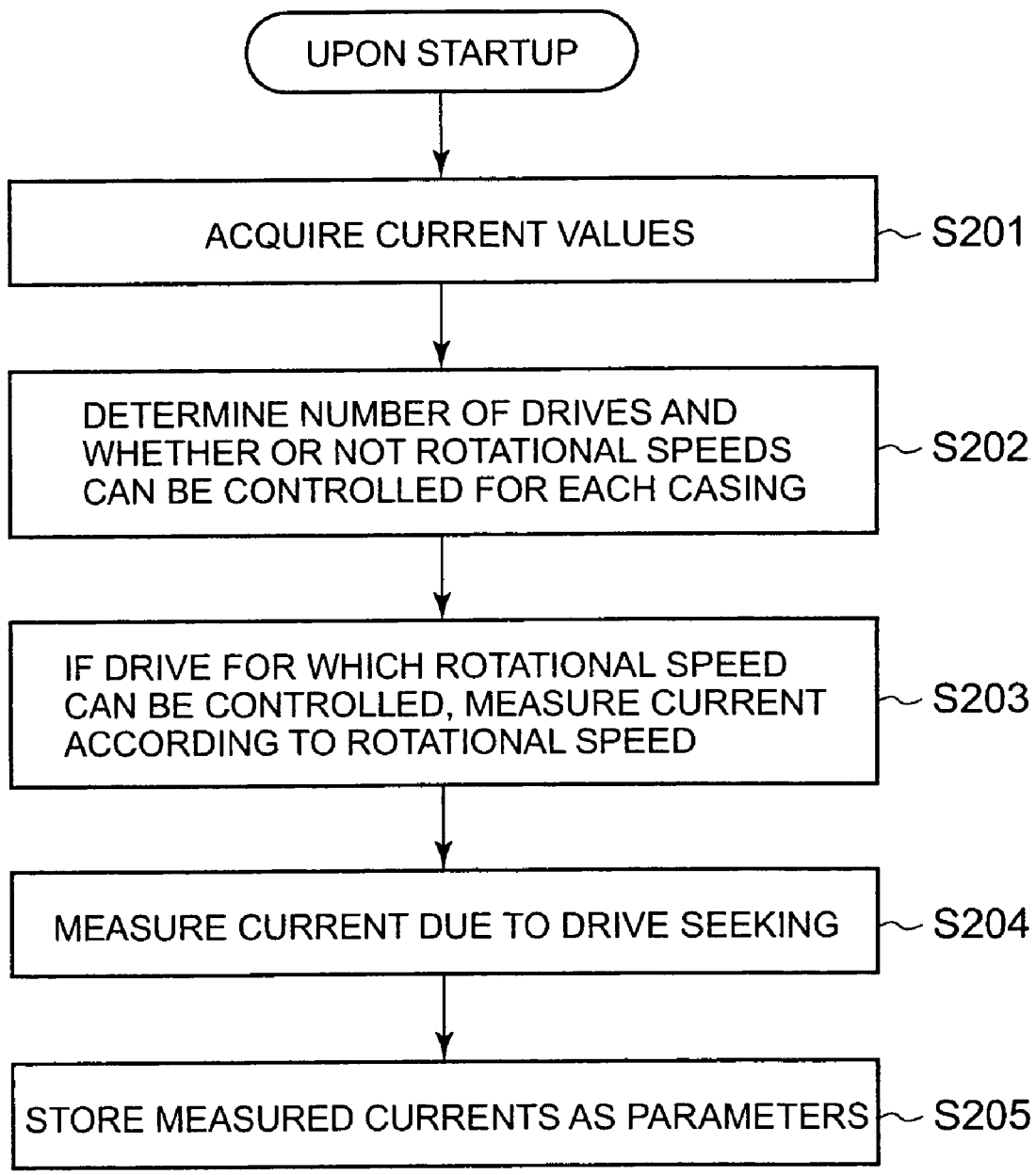
FIG. 16 shows an example of the flow of processing carried out upon storage system startup in a fourth variation of the embodiment of the present invention.

FIG. 16 shows an example of the flow of processing carried out upon storage system startup.

The power monitoring control module 201 acquires current values from the current monitoring units 111 and 141 (S201).

The power monitoring control module 201 determines, for each of the basic casing 101 and the additional casings 131, the number of disk drives installed and whether or not the rotational speeds of the disk drives can be controlled (S202). The number of disk drives installed can be determined, for example, according to whether or not there is a response upon sending a signal to each port to which a disk drive may be connected. Whether or not the rotational speed of a disk drive can be controlled can be determined, for example, from disk drive attributes (e.g. the disk drive vendor, type, etc.) obtained by sending an inquiry to the disk drive and receiving the disk drive attributes as a response. The disk drive attributes may contain information indicating whether or not the rotational speed can be controlled, or in the case that such information is not contained, whether or not the rotational speed can be controlled may be determined by referring to a table in which are recorded the attributes of disk drives for which the rotational speed can be controlled, the determination being carried out based on the table and the received disk drive attributes.

In the case that the power monitoring control module 201 identifies a disk drive for which the rotational speed can be controlled, the power monitoring control module 201 instructs this disk drive to rotate at a certain rotational speed, and monitors the current value (S203). That is, the power monitoring control module 201 monitors the change in the current value due to the disk drive rotating at the instructed rotational speed.

Similarly, the power monitoring control module 201 issues a dummy access instruction to the disk drive, and monitors the current value (S204). This access instruction is an instruction specifying an access range, in other words an access instruction specifying the seek amount for the disk drive to be a certain amount. That is, the power monitoring control module 201 monitors the change in the current value due to seeking with the instructed seek amount.

The power monitoring control module 201 is able to store the identified current value changes in the memory 123 as parameters separately for the rotational speed and the seek amount (S205). The power monitoring control module 201 is able to calculate the power consumption values corresponding to the rotational speed and the seek amount by multiplying the current value changes by the voltage value, and is able to store the calculated power consumption values in the memory 123 as power consumption value rules.

Figure 17:
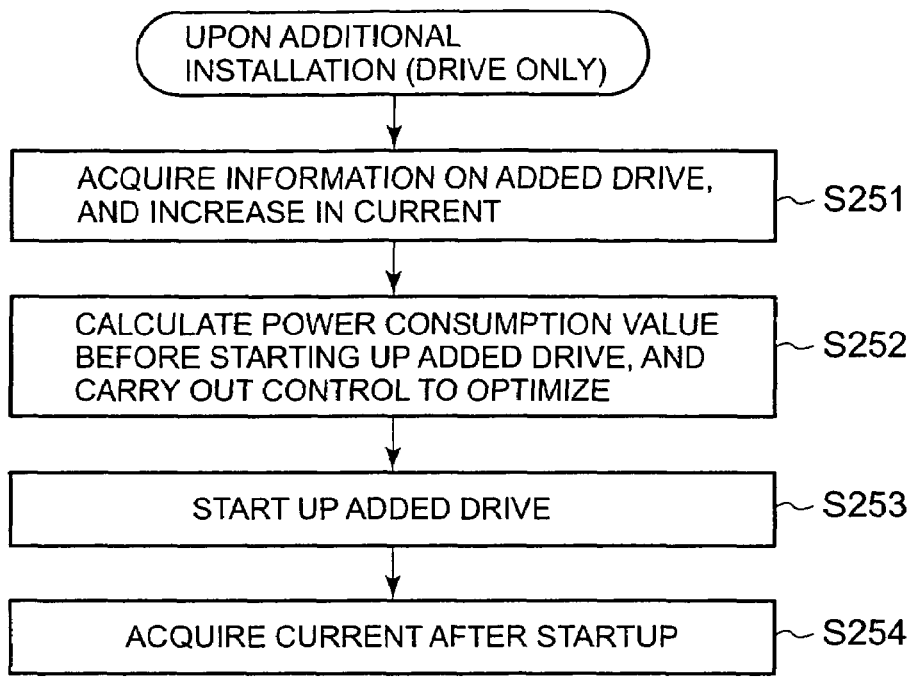
FIG. 17 shows an example of the flow of processing carried out upon installing an additional disk drive in the fourth variation of the embodiment of the present invention.

FIG. 17 shows an example of the flow of processing carried out upon installing an additional disk drive.

The power monitoring control module 201 acquires information on an added disk drive by sending a predetermined inquiry to that disk drive, and acquires the increase in the current value due to the addition of the disk drive by calculating the difference between the current value immediately before the addition and the current value acquired immediately after the addition (S251).

The power monitoring control module 201 calculates the power consumption value at the present time before starting up the added disk drive, and based on this power consumption value and the allowed power value, carries out control to optimize both power saving and performance, i.e. carries out IO processing control or release thereof, cache control or release thereof, and/or drive control or release thereof (S252).

After S252, the power monitoring control module 201 starts up the added disk drive (S253), and acquires the increase in the current value due to the startup of the added disk drive by calculating the difference between the current value immediately before the startup and the current value acquired immediately after the startup (S254). Note that this step S254 can be carried out, for example, to acquire the current value in a state in which the disk drive has actually been started up. Likewise for S304, described below.

Figure 18:
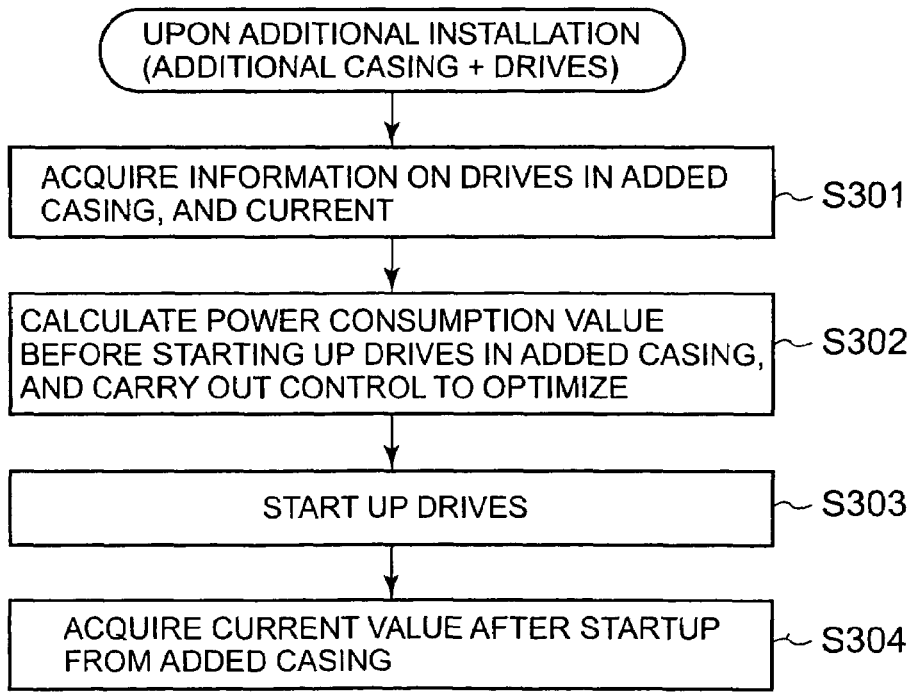
FIG. 18 shows an example of the flow of processing carried out upon installing an additional casing having disk drives installed therein in the fourth variation of the embodiment of the present invention.

FIG. 18 shows an example of the flow of processing carried out upon installing an additional casing having disk drives installed therein.

The power monitoring control module 201 acquires information on disk drives in the added additional casing by sending a predetermined inquiry to those disk drives, and acquires the increase in the current value due to the addition of the additional casing by calculating the difference between the current value immediately before the addition and the current value acquired immediately after the addition (S301).

The power monitoring control module 201 calculates the power consumption value at the present time before starting up the disk drives in the added additional casing, and based on this power consumption value and the allowed power value, carries out control to optimize both power saving and performance, i.e. carries out IO processing control or release thereof, cache control or release thereof, and/or drive control or release thereof (S302).

After S302, the power monitoring control module 201 starts up the disk drives in the additional casing (S303), and acquires the increase in the current value due to the startup of the disk drives in the additional casing by calculating the difference between the current value immediately before the startup and the current value acquired immediately after the startup (S304).

Figure 19:
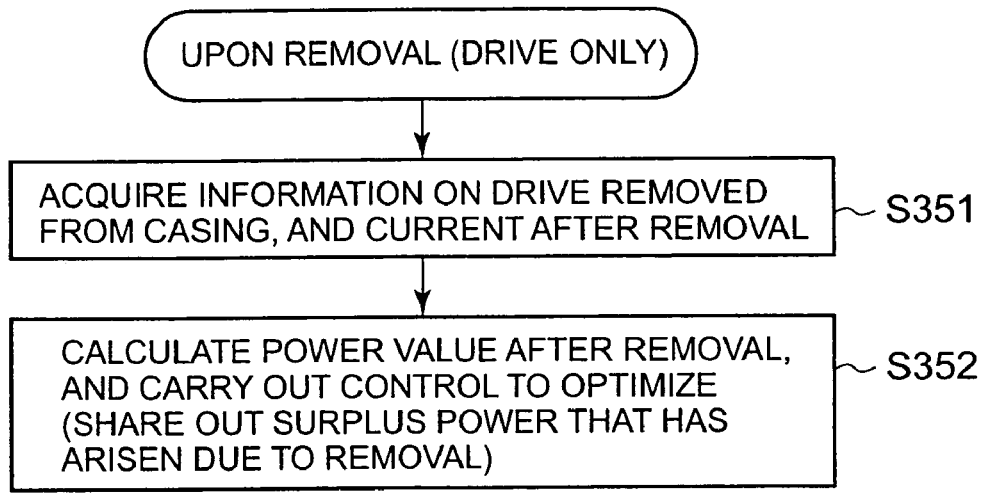
FIG. 19 shows an example of the flow of processing carried out upon removing a disk drive in the fourth variation of the embodiment of the present invention.

FIG. 19 shows an example of the flow of processing carried out upon removing a disk drive.

The power monitoring control module 201 acquires information on a removed disk drive by sending a predetermined inquiry to that disk drive, and acquires a current value after the removal from at least the current monitoring unit in the casing from which the disk drive was removed (S351).

The power monitoring control module 201 calculates the power consumption value after the removal from the acquired current value, and shares out the difference between the power consumption value after the removal and the power consumption value before the removal (S352). That is, based on the power consumption value after the removal and the allowed power value, the power monitoring control module 201 carries out control to optimize both power saving and performance, i.e. carries out IO processing control or release thereof, cache control or release thereof, and/or drive control or release thereof.

Figure 20:
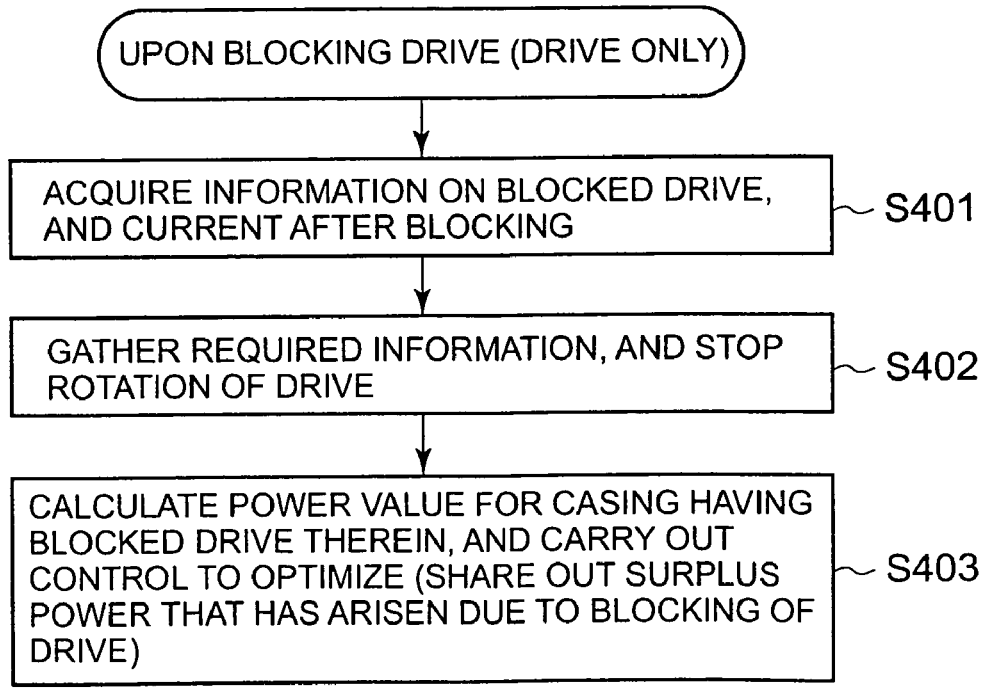
FIG. 20 shows an example of the flow of processing carried out upon blocking a disk drive in the fourth variation of the embodiment of the present invention.

FIG. 20 shows an example of the flow of processing carried out upon blocking a disk drive.

The power monitoring control module 201 acquires information on the blocked disk drive, and acquires a current value from at least the current monitoring unit in the casing having the blocked disk drive therein (S401).

The power monitoring control module 201 gathers required information, and stops the rotation of the blocked disk drive (S402). Here, the required information is, for example, information relating to problems relating to the blocking of the disk drive. Moreover, it is not necessarily the case that the rotation is stopped when a disk drive is blocked. In the present embodiment, "block" means to put into a non-operating state, and this is not related to whether or not the disk is rotating.

The power monitoring control module 201 calculates the power consumption value for the casing having the blocked disk drive therein, and shares out the difference between the power consumption value after the blocking and the power consumption value before the blocking (S403). That is, based on the power consumption value after the blocking and the allowed power value, the power monitoring control module 201 carries out control to optimize both power saving and performance, i.e. carries out IO processing control or release thereof, cache control or release thereof, and/or drive control or release thereof.

An embodiment of the present invention and several variations have been described above. However, this embodiment and these variations are merely illustrative for explaining the present invention, and the scope of the present invention is not limited to only this embodiment and these variations. The present invention can also be implemented through any of various other modes so long as there is no departure from the gist of the present invention.

For example, each of the disk drives 127 and 157 may instead be another type of storage device such as a flash memory. For example, in the case of a flash memory, commencing rotation and stopping rotation should be read instead as turning on the power supply and turning off the power supply.

Moreover, the construction of the main controller 117 described above is an example, and another construction may be adopted. For example, instead of the construction described above, the main controller 117 may comprise at least one first control circuit board that controls communication with a host device (e.g. a host computer or another storage system), at least one second control circuit board that controls communication with storage devices, a cache memory that can store data to be transferred between the host device and the storage devices, a control memory that can store data for controlling the storage system 107, and a connecting unit (e.g. a switch such as a crossbar switch) that connects the first control circuit board, the second control circuit board, the cache memory and the control memory. Each control circuit board may be provided with at least one microprocessor. In this case, one of the first control circuit board and the second control circuit board may carry out processing as the main controller 117, or both may do so in collaboration. The control memory may be omitted, in which case an area for storing information that would have been stored in the control memory may be provided in the cache memory.

Moreover, for example, in each casing, there may be provided a voltage monitoring unit that measures the voltage applied to the loads from the power supply unit. The power monitoring control module 201 may acquire the measured voltage value from the voltage monitoring unit in each casing, and calculate the power consumption value by multiplying the acquired voltage value by the current value acquired from the current monitoring unit.

Moreover, for example, if the voltage value applied from each of the power supply units is fixed, then the control described above may be carried out using current values, without calculating power consumption values.

Moreover, for example, control of a fan (e.g. power supply on/off or rotational speed), and control of other loads may also be carried out based on the power consumption values and the allowed power values.

What is claimed is:

1. A storage system connected to a host device from which an IO command is sent, the storage system comprising:
    a plurality of load devices that act as loads including a plurality of storage devices;
    a current measuring unit that measures a current value flowing into the plurality of load devices;
    a power calculating unit that calculates, at each time, a power consumption value consumed by the plurality of load devices based on the measured current value; and
    a controller that receives the IO command from the host device, and accesses a storage device that follows the IO command, out of the plurality of storage devices;
    wherein the controller carries out power consumption control such that the calculated power consumption value is not more than a predetermined allowed power value and a difference between the power consumption value and the allowed power value is reduced.

2. The storage system according to claim 1, wherein the power consumption control comprises carrying out power consumption suppression control in which the power consumption value is suppressed but a load device operating state is degraded, and releasing the power consumption suppression control so as to adjust the number of times that the power consumption suppression control is carried out.

3. The storage system according to claim 1, further comprising:
    a basic subsystem having at least the controller therein; and
    an additional subsystem connected to the basic subsystem;
    wherein the allowed power value is prepared taking each subsystem as a unit;
    the additional subsystem comprises at least two load devices including at least two storage devices, a second controller that communicates with the controller, and a second current measuring unit that measures a current value flowing into the at least two load devices, the second controller acquiring from the second current measuring unit a second current value which is the current measured by the second current measuring unit; and
    the controller acquires the second current value from the second controller, calculates a power consumption value for the second controller based on the second current value, and carries out the power consumption control for each subsystem separately in accordance with the calculated power consumption value and for which subsystem this power consumption value is calculated.

4. The storage system according to claim 2, wherein the controller carries out, as the power consumption suppression control, IO processing control of delaying commencement of IO processing according to the received IO command.

5. The storage system according to claim 4, wherein each of the plurality of storage devices is a disk drive having a rotating disk as a storage medium, and in the IO processing control, out of a plurality of IO commands to be targeted for IO processing delay, the controller prioritizes processing an IO command for sequential access over an IO command for random access.

6. The storage system according to claim 4, wherein in the IO processing control, out of a plurality of IO commands to be targeted for IO processing delay, the controller prioritizes processing an IO command for which a storage device to be accessed is in a high operating state over an IO command for which a storage device to be accessed is in a low operating state.

7. The storage system according to claim 2, further comprising a cache memory,
    wherein the controller is constructed so as to write data to the cache memory in accordance with an IO command from the host device, and write the data written to the cache memory to a storage device that is to be accessed according to the IO command;
    and as the power consumption suppression control, the controller carries out cache control of controlling an order of writing to the storage devices from the cache memory.

8. The storage system according to claim 7, wherein in the cache control, out of a plurality of data in the cache memory, the controller prioritizes writing data that is to be written to a storage device in a high operating state over data that is to be written to a storage device in a low operating state.

9. The storage system according to claim 2, wherein as the power consumption suppression control, the controller carries out storage device control of putting a storage device operating state into a low operating state.

10. The storage system according to claim 9, wherein in the storage device control, the controller decides the storage device to be put into the low operating state based on at least one of an access frequency and whether or not there has been access recently for each of the plurality of storage devices.

11. The storage system according to claim 1, wherein the plurality of storage devices include a first storage device and a second storage device, and as the power consumption control, the controller carries out processing of putting the first storage device into a high operating state, moving data in the second storage device into the first storage device, and putting the second storage device from which the data has been moved into a low operating state.

12. The storage system according to claim 11, wherein the first storage device is provided in a basic subsystem having the controller therein, and the second storage device is provided in an additional subsystem connected to the basic subsystem.

13. The storage system according to claim 1, wherein at least two storage device groups are formed from the plurality of storage devices, each of the storage device groups being constituted from a predetermined number of at least two of the storage devices, and the controller controls the storage device operating state taking the storage device groups as units.

14. The storage system according to claim 1, wherein in a case that a storage device in a low operating state is to be accessed, the controller determines whether or not a power consumption value predicted to increase due to the storage device being put into a high operating state is not more than the allowed power value, and if the predicted power consumption value is not more than the allowed power value, puts the storage device into the high operating state and then accesses the storage device.

15. The storage system according to claim 1, wherein upon at least one change out of adding, removing, and blocking a load device, the power calculating unit acquires a current value and calculates a power consumption value after the change, and the controller carries out the power consumption control based on the power consumption value calculated after the change.

16. The storage system according to claim 1, further comprising a power supply unit that supplies power to the plurality of load devices;
wherein the current measuring unit is provided in the power supply unit.

17. The storage system according to claim 1, wherein the plurality of load devices include first and second load devices;
the storage system is constructed from a basic subsystem and an additional subsystem connected to the basic subsystem;
the allowed power value is prepared taking each subsystem as a unit;
the basic subsystem comprises the controller, at least two of the first load devices, and a first power supply unit that supplies power to the at least two first load devices, the first power supply unit having therein a first current measuring unit that measures a current flowing into the at least two first load devices;
the additional subsystem comprises at least two of the second load devices including at least two storage devices, a second controller that communicates with the controller, and a second power supply unit that supplies power to the at least two second load devices, the second power supply unit having therein a second current measuring unit that measures a current value flowing into the at least two second load devices;
the second controller acquires from the second current measuring unit a second current value which is the current value measured by the second current measuring unit;
the controller acquires the second current value from the second controller, calculates a power consumption value for the second controller based on the second current value, and carries out the power consumption control for each subsystem separately in accordance with the calculated power consumption value and for which subsystem this power consumption value is calculated; and
the power consumption control comprises carrying out power consumption suppression control in which the power consumption value is suppressed but a load device operating state is degraded, and releasing the power consumption suppression control, so as to adjust the number of times that the power consumption suppression control is carried out.

18. A management computer connected to a storage system that is connected to a host device from which an IO command is sent, the storage system comprising a plurality of load devices that act as loads including a plurality of storage devices; a current measuring unit that measures a current value flowing into the plurality of load devices; a power calculating unit that calculates, at each time, a power consumption value consumed by the plurality of load devices based on the measured current value; and a controller that receives the IO command from the host device, and accesses a storage device that follows the IO command, out of the plurality of storage devices wherein the controller carries out power consumption control such that the calculated power consumption value is not more than a predetermined allowed power value and a difference between the power consumption value and the allowed power value is reduced, the management computer comprising:
a storage resource;
an allowed value setting unit that sets the allowed power value into the storage system;
a power consumption management unit that acquires the power consumption value calculated at each time and records the power consumption value in the storage resource; and
a display control unit that displays the recorded power consumption value.

19. The management computer according to claim 18, further comprising an IO monitoring unit that acquires the number of IO processing instances in each time period, and records in the storage resource a relationship between the time period and the number of IO processing instances;
wherein the display control unit displays a relationship between the number of IO processing instances in each time period and the power consumption value at each time.

20. The management computer according to claim 19, wherein the display control unit displays, in the same display area, a graph of the number of IO processing instances in each time period and a graph of the power consumption value at each time.

* * * * *